(12) United States Patent
Matterne et al.

(10) Patent No.: US 7,920,584 B2
(45) Date of Patent: Apr. 5, 2011

(54) DATA PROCESSING SYSTEM

(75) Inventors: Johan Matterne, Landen (BE);
Martinus Cornelis Wezelenburg, Kessel-Lo (BE)

(73) Assignee: ARM Limited, Cambridge (GB)

( * ) Notice: Subject to any disclaimer, the term of this patent is extended or adjusted under 35 U.S.C. 154(b) by 1290 days.

(21) Appl. No.: 11/402,192

(22) Filed: Apr. 12, 2006

(65) Prior Publication Data

US 2006/0251092 A1   Nov. 9, 2006

Related U.S. Application Data

(63) Continuation-in-part of application No. 11/121,185, filed on May 4, 2005.

(30) Foreign Application Priority Data

May 20, 2005 (GB) .................................. 0510350.2
Oct. 3, 2005 (GB) .................................. 0520072.0
Mar. 3, 2006 (GB) .................................. 0604353.3

(51) Int. Cl.
*H04L 12/28* (2006.01)
*G06F 3/00* (2006.01)
*G06F 15/00* (2006.01)

(52) U.S. Cl. ............................. 370/412; 710/52; 712/28

(58) Field of Classification Search .................. 370/412, 370/415, 419; 710/52–54, 58, 59, 61; 712/28–31; 718/100, 102–104
See application file for complete search history.

(56) References Cited

U.S. PATENT DOCUMENTS

| | | |
|---|---|---|
| 5,440,740 A | 8/1995 | Chen et al. |
| 5,602,995 A | 2/1997 | Hendel et al. |
| 5,623,619 A | 4/1997 | Witt |
| 5,748,468 A | 5/1998 | Notenboom et al. |
| 5,752,069 A | 5/1998 | Roberts et al. |
| 5,860,104 A | 1/1999 | Witt et al. |

(Continued)

FOREIGN PATENT DOCUMENTS

DE 103 23 189 12/2004

(Continued)

OTHER PUBLICATIONS

English translation of Official Action mailed Dec. 2, 2008 in corresponding Japanese Application No. 2006-124134.

(Continued)

*Primary Examiner* — Aung S Moe
*Assistant Examiner* — Kerri M Rose
(74) *Attorney, Agent, or Firm* — Nixon & Vanderhye P.C.

(57) ABSTRACT

A data processing system is provided comprising a main processor operable to perform a plurality of data processing tasks, a data engine having a data engine core operable to perform a number of said plurality of data processing tasks on behalf of said main processor and a data stream processing unit providing a data communication path between said main processing unit and said data engine core. The data stream processing unit has a control interface operable to receive from said data engine core at least one command and a data stream controller operable to receive at least one input data stream and to perform at least one operation on said at least one input data stream to generate at least one output data stream comprising a sequence of data elements. The data stream processing unit is responsive to said at least one command from said data engine core to control said data stream controller to perform said at least one operation.

62 Claims, 15 Drawing Sheets

U.S. PATENT DOCUMENTS

| | | | |
|---|---|---|---|
| 6,055,579 A * | 4/2000 | Goyal et al. | 712/28 |
| 6,574,273 B1 | 6/2003 | Luna et al. | |
| 6,625,639 B1 * | 9/2003 | Miller et al. | 718/100 |
| 6,625,654 B1 * | 9/2003 | Wolrich et al. | 718/102 |
| 6,643,716 B2 | 11/2003 | Hunsaker et al. | |
| 6,934,951 B2 * | 8/2005 | Wilkinson et al. | 712/28 |
| 6,983,350 B1 * | 1/2006 | Wheeler et al. | 710/52 |
| 6,999,994 B1 * | 2/2006 | Benayoun et al. | 718/100 |
| 7,233,331 B2 * | 6/2007 | Kato | 718/102 |
| 7,389,508 B2 * | 6/2008 | Aguilar et al. | 718/104 |
| 7,478,390 B2 * | 1/2009 | Brokenshire et al. | 718/100 |
| 2004/0025159 A1 * | 2/2004 | Scheuermann et al. | 718/100 |
| 2005/0036557 A1 | 2/2005 | Balakrishnan et al. | |
| 2005/0122986 A1 * | 6/2005 | Starr et al. | 370/412 |

FOREIGN PATENT DOCUMENTS

| | | |
|---|---|---|
| EP | 0 945 788 | 9/1999 |
| JP | 11-272631 | 10/1999 |

OTHER PUBLICATIONS

PCT International Search Report mailed Jul. 26, 2006.

H. Igura et al, "An 800-MOPS, 11-mW, 1.5-V, Parallel DSP for Mobile Multimedia Processing" *IEEE Journal of Solid-State Circuits*, vol. 33, No. 11, Nov. 1998, pp. 1820-1828.

J. Watlington et al, "A System for Parallel Media Processing" *Parallel Computing*, vol. 23, No. 12, 1997, pp. 1793-1809.

* cited by examiner

| 0 | 4 5 | 34 35 | 45 46 50 51 | 65 |
|---|---|---|---|---|
| HDR1 | | DATA1 | DATA2A | HDR2 | DATA2B |

Fig. 9A

| ACTION | INSTRUCTIONS EXECUTED BY DATA ENGINE CORE | FUNCTIONS PERFORMED BY DATASTREAM PROC. UNIT |
|---|---|---|
| read HDR1 | STEP 1 Getbits(5) | output DS[0:4] from FIFO to data engine |
| read DATA1 | STEP 2 Getbits(30) | output DS[5:34] from FIFO to data engine |
| buffer DATA2A | STEP 3 Bufferbits(11) | output DS[35:45] to buffer |
| read HDR2 | STEP 4 Getbits(5) | output DS[46:50] from FIFO to data engine |
| prepare to access buffer | STEP 5 Backstep(11) | set bit-pointer to bit-index 35 |
| retrieve DATA2A | STEP 6 Getbits(11) | output DS[35:45] from buffer to data engine |
| retrieve DATA2B | STEP 7 Getbits(15) | output DS[51:65] to data engine |

DATA PROCESSING SYSTEM

CROSS REFERENCE TO RELATED APPLICATIONS

This application is a Continuation-In-Part of U.S. application Ser. No. 11/121,185 filed 4 May 2005 and claims priority to GB Application No. 0510350.2 filed 20 May 2005, GB Application No. 0520072.0 filed 3 Oct. 2005 and GB Application No. 0604353.3 filed 3 Mar. 2006. The entire contents of these applications are incorporated herein by reference.

Related co-pending U.S. patent application Ser. No. 11/403,201, filed Apr. 13, 2006, Wezelenburg et al, is commonly owned and herein incorporated by reference.

BACKGROUND OF THE INVENTION

1. Field of the Invention

The present invention relates to the field of data processing. More particularly, this invention relates to data processing systems that require operations to be performed on one or more data streams.

2. Description of the Prior Art

It is known to provide data processing systems that are capable of performing operations on data and such operations can involve data flow in both directions i.e. input to output or output to input, where each of the input data and the output data can have an associated data format. Examples of commonly required data stream operations for data flow in both directions include data alignment, buffering, forwarding and rewinding of a data stream and datastream merging and splicing functions, as well as retrieval of variable-length coded syntax elements on the stream. It is also often required to make alterations to the input temporal sequence to provide an output data stream having a different temporal sequence i.e. to provide out-of-order access to a datastream. Examples of such data processing systems that require operations to be performed are systems for processing multimedia datastreams comprising audio data and/or video data that have been encoded according to known formats, the format having been defined by an international "standard" (e.g. MP3 or MPEG).

However, these known data processing systems place a significant burden on the programmer, since the programmer is required to explicitly manage many of the data handling tasks such as keeping track of which portions of the input data stream have been received, operated on and output or to provide and maintain a software library with a plurality of functions for performing data handling. Both explicit management of data handling is time-consuming and providing and maintaining a software library are time-consuming and inefficient. Thus there is a need for a data processing system that abstracts away from the programmer at least some of the tasks associated with handling input and output data in a more efficient way.

In a data processing apparatus having a main processing unit, it is known to provide a data engine, sometimes also referred to as a loosely-coupled coprocessor (loosely coupled in the sense that it resides externally to the main processing unit and that synchronisation between the data engine and the main processing unit only takes place on a process or task level), which can be used to handle certain data processing tasks on behalf of the main processing unit. In this description the term main processing unit (i.e. main processor) is defined such that it may be a central processing unit (CPU), or alternatively may be some other simplified control element within the data processing apparatus, for example a control element which merely controls boot up, and then delegates all other tasks to one or more data engines. Providing a data engine can lead to various performance improvements with respect to a data processing apparatus where all of the tasks are handled by the main processing unit, these improvements being for example one or more of an increase in speed of execution, a reduction in power consumption for a given set of tasks, or a decrease in the total silicon area required to support the required functionality. However, data stream handling tasks are typically computationally intensive and when allocated to the data engine can consume a large proportion of the computational power of the data engine thereby reducing its availability to perform other data processing tasks on behalf of the main processor.

U.S. patent application Ser. No. 11/121,185, which was filed on 4 May 2005 describes a data processing apparatus having a local First-in-First-Out (FIFO) memory, which may be used to provide a window into a locally stored data stream. The contents of U.S. Ser. No. 11/121,185 are incorporated herein by reference.

SUMMARY OF THE INVENTION

According to a first aspect, the present invention provides a data processing system comprising:

a main processor operable to perform a plurality of data processing tasks;

a data engine having a data engine core operable to perform a number of said plurality of data processing tasks on behalf of said main processor;

a data stream processing unit providing a data communication path between said main processing unit and said data engine core, said data stream processing unit having:
   a control interface operable to receive from said data engine core at least one command; and
   a data stream controller operable to receive at least one input data stream and to perform at least one operation on said at least one input data stream to generate at least one output data stream comprising a sequence of data elements;

wherein said data stream processing unit is responsive to said at least one command from said data engine core to control said data stream controller to perform said at least one operation.

Note that each of the input stream and the output data stream can come from, for example, either the data engine or an external process (such as a direct memory access).

The present invention recognises that handling of data streams can be performed more efficiently by providing a datastream processing unit that performs operations on an input data stream on behalf of the data engine. The efficiency is improved since a subset of the processing tasks allocated to the data engine by the main processor can be delegated to the datastream processing unit via the control interface. This reduces the computational burden on the data engine because at least a subset of the data stream handling operations are performed by the data stream processing unit on behalf of the data engine. Accordingly, the capacity of the data engine to perform other data processing operations is increased and overall computational efficiency is improved because the datastream processing unit can perform processing tasks in parallel with the data engine. Furthermore, several elementary processing operations can be combined into a more complex operation that can be efficiently performed by the datastream processing unit. The data stream processing unit provides support for data stream operations such as data alignment, buffering, rewinding or going forward, in the stream, splicing and merging of data streams as well as interpretation and decoding of syntax elements defined in the data stream. Thus the data stream processing unit is used to perform a subset of data processing tasks to relieve the burden on the main processor and on the data engine. Effectively, this means that the control interface of the data stream controller can be viewed as a state machine capable of running a respective process without further intervention from the main processor or from the data engine. In arrangements where the data stream controller comprises more than one interface, each interface will have an associated state machine and an associated process and a given process may depend upon the current state of state machines associated with others of the interfaces. Information on the states of each of a plurality of state machines can be exchanged via the data stream controller.

The datastream processing unit is responsive to a command (such as control signals) from the data engine core to control the data controller of the datastream processing unit to perform an operation on the input data stream. The ability to send commands from the data engine core to the data stream processing operation to perform one or more operations on the input data stream enables some of the data handling tasks involved in generation of the output data stream to be abstracted away from the programmer by suitably defining the commands issued by the data engine core. Furthermore, the ability to define commands to control operations performed by the datastream processing unit on the input data stream offers the programmer an enhanced degree of flexibility in the type of operations that can be performed.

The main processing unit can take a variety of forms. For example, it may be a central processing unit (CPU), or alternatively may be some other simplified control element within the data processing apparatus, for example a control element which merely controls boot up, and then delegates all other tasks to one or more data engines.

In one embodiment the data stream processing unit is operable to maintain management information comprising at least one reference position in the at least one input data stream. The data stream processing unit actions the at least one command in dependence upon the at least one reference position. This simplifies access to data elements within the input data stream since the task of maintaining a reference point is performed by the datastream controller. This reduces the complexity of the commands issued by the data engine core to the datastream processing unit.

In one embodiment, the number of data processing tasks performed by the data engine core comprises a sequence of instructions including at least one instruction of an instruction set executable by the data engine core. The data engine core is operable upon execution of the at least one instruction to issue the at least one command to the control interface of the data stream processing unit. This simplifies the interaction of the data stream processing unit with the data engine core since processing tasks to be performed by the data engine core can be readily mapped onto instructions of the instruction set.

In one embodiment the input data stream is a multimedia data stream structured according to a predetermined set of rules and the instruction set is defined in dependence upon the predetermined set of rules. The set of rules could correspond, for example, to an audio data standard such as an MP3 standard or a video data standard such as an MPEG standard. The ability to define the instruction set such that it is specifically tailored to perform a set of processing operations typically performed when processing a given multimedia data stream provides a great deal of flexibility to fine-tune the processing performance for a particular set of processing operations.

In one embodiment the data stream processing unit is operable to act on the at least one command asynchronously with respect to reception of the input data stream by the data stream controller or with respect to the transmission of output data stream elements. This provides flexibility to accommodate variations in the arrival or departure rate of the data stream when performing processing tasks on the input or output data streams.

In one embodiment the data stream controller is configurable by at least one of the data engine and the main processor with configuration information. This provides the datastream processing unit with an enhanced level of autonomy from the main processor since there is no need for the datastream processing unit to request this configuration information from either the main processor or the data engine during runtime.

In one embodiment the data stream controller is operable when performing the at least one operation to selectively buffer in an associated buffering resource at least a portion of the at least one input data stream. This provides an efficient way of giving the data engine out-of-order access to a data stream since portions of data can be buffered for output at a later time.

In one embodiment the data stream processing unit comprises data output logic comprising a multiplexer operable to selectively output data from the buffering resource and wherein the data stream controller is operable to control an output of the multiplexer to generate the at least one output data stream. This simple circuitry allows for efficient yet effective management of data flow since selected portions of data can be readily allocated for buffering in response to a command from the data stream processing unit.

In one embodiment the associated buffering resource is a software FIFO. In some such embodiments the memory region is defined by partition pointers, while access to the data is controlled by the state of at least one head pointer and at least one tail pointer. Use of a software FIFO allows for more rapid and efficient access to buffered data and makes it easy for the data stream processing unit to manage the buffering resource by simply managing the head pointer and the tail pointer.

In one embodiment the data stream controller is operable maintain a record of which portions of the at least one input data stream are currently stored in the associated buffering resource. Thus the programmer need have no knowledge of where a requested data portion is stored, rather he can just request a specific portion of the data stream and the data stream processing unit can determine independently whether or not that data need be retrieved from the buffer.

In one embodiment the configuration information comprises a size of the buffering resource associated with the data stream controller. This allows the data stream processing unit to manage buffering operations more autonomously and obviates the need for the programmer or for the data engine to keep track of the buffer occupancy level.

In one embodiment the data stream processing unit comprises a processing interface providing a data path to a processing module and wherein the processing module is operable to perform a processing task in response to execution of at least one instruction of the instruction set executable by the data processor core. This enhances the functionality of the data stream processing unit since it provides a further data flow path from which to input/output data elements. The processing resource made available by the accessibility of the processing module can be used to perform specialized data processing functions such as decoding in a particularly efficient manner.

In one embodiment the configuration information supplied to the data stream processing unit by at least one of the data engine and the main processor comprises at least one characteristic of the processing resource. This increases the autonomy of the data stream processing unit subsequent to an initial configuration operation, it need not refer to the main processor to determine which additional processing resources are available to it in order to follow commands from the data stream functional unit to perform data stream processing tasks.

In one embodiment the configuration information supplied to the data stream processing unit by at least one of the data engine and the main processor comprises a start point and an end point of the buffering resource associated with the data stream controller. Again, this increases the autonomy of the data stream processing unit in performing data stream operations.

In one embodiment the at least one input data stream comprises a plurality of data portions ordered in an input temporal sequence and the at least one output data stream comprises the plurality of data portions of the input temporal sequence ordered in an output temporal sequence different from the input temporal sequence.
This provides out-of-order access to an input data stream, which is a commonplace data manipulation operation for applications such as Constant Bit-Rate (CBR) audio coding algorithms.

In one embodiment the at least one instruction of the instruction set executable by the data engine core is either an instruction having a conditional return or an instruction having an unconditional return. Categorising instructions in this way allows computational deadlock to be more easily avoided by providing for an abort operation to be associated with conditionally returning instructions.

In one embodiment the at least one instruction corresponds to a respective process to be performed by the data stream controller in response to the at least one command issued by the data stream functional unit and wherein the respective process has an associated state machine maintained by the data stream controller. By associating a computational process being performed by the data stream processing unit with a given state it is possible to readily inhibit certain control processes that may compromise completion of a particular processing task by precluding performance of that control process for the duration of time that the data stream processing unit is in the state associated with that processing task. Modelling of processing tasks as respective states of the data stream controller is also an efficient way of enabling the data stream processing unit to keep track of the data manipulations being performed.

In one embodiment the instruction set executable by the data engine core comprises a buffering instruction operable to cause the data stream controller to selectively buffer data elements of the at least one input data stream. Buffering is a frequently performed task for out-of-order access and data stream splicing and provision of an explicit buffering instruction allows for efficient data manipulation.

In one embodiment the instruction set executable by the data engine core comprises a data retrieval instruction operable to cause the data stream controller to retrieve at least one data element of the at least one input data stream from the buffering resource and to output the at least one data element to the at least one output data stream. This facilitates access by the programmer to buffered data elements without the need to for the programmer to specify exactly where the buffered data elements were actually stored and without the overhead of maintaining information with regard to the physical data location in the program code devised by the programmer for performing operations on the data stream.

In one embodiment the management information comprises at least a current output position representing data in one of the at least one input data stream to be supplied next by the data stream controller to the at least one output data stream. This relieves the burden on the programmer of keeping track of which data has already been output and simplifies the commands that must be supplied to the data engine to access data of the data stream.

In one embodiment the instruction set executable by the data engine core comprises a backstep instruction operable to cause the current output position to be changed such that it corresponds to a data element at an earlier point in an input temporal sequence associated with the corresponding input data stream. This facilitates out-of-order access to an input data stream.

In one embodiment the management information comprises at least one of:

a record of which data elements of the at least one input data stream have been stored in the buffering resource; and a record of which data elements of the at least one input data stream have been received by the data stream controller.

This means that one or more of the above data management tasks can be independently managed by the data stream controller and the complexities of these management tasks can be readily concealed from the programmer.

In one embodiment the instruction set executable by the data engine core comprises a data insertion instruction operable to cause the data stream controller to insert data from said data engine into the at least one output data stream. This provides the flexibility to insert specified data from the data engine into a data stream.

In one embodiment the data processing system comprises a direct memory access interface operable to provide a data communication path to a direct memory access controller for supply of the at least one input data stream to the data stream controller.

In one such embodiment the configuration information comprises at least one property of the direct memory access controller. This makes access to data streams on which manipulation is to be performed more efficient since access to the data can be obtained without referring to the main processor. In one such embodiment the configuration information supplied to the data stream processing unit by the main processor comprises at least one property of the DMA controller. This means that the data stream controller can more readily independently manage access to input data stream, which reduces the processing burden on the main processor and thereby improves efficiency.

In one embodiment the data stream processing unit comprises a data input register for temporarily storing data elements of the at least one input data stream before the data stream controller supplies the stored data elements to the at least one output data stream. The local buffering of input data elements provides some flexibility within the datastream processing unit to cope with a range of rates of arrival of incoming data and facilitates data management operations such as keeping track of which data elements of an incoming data stream have already been received.

In one embodiment the instruction set executable by said data engine core comprises a count setting instruction operable to command said data stream processing unit to set an upper limit for a data pointer state relative to a state of said data pointer at a moment a command associated with said count setting instruction is sent from the data engine core to said data stream processing unit. Following execution of the count setting instruction, the data stream processing unit will continue to act on requests for data elements or syntax elements. However, the data stream processing unit will prevent the data stream pointer value from advancing beyond the set upper limit so that regardless of any further request for data, the data pointer will remain at this upper limit. Any data element request that is issued after the data pointer has reached the upper limit or that would lead to the data pointer having to exceed this upper limit will give rise to either a configurable or a fixed error code (i.e. zero) and the setting of a bit in a status register, which corresponds to part of the management information maintained by the data stream processing unit. The data stream processing unit can be unlocked from the final state in which the upper limit has been reached by:—(i) re-issuing the count setting instruction with a new value; (ii) issuing a reset instruction; or (iii) issuing the count setting instruction with a special code (i.e. −1).

Although the data stream processing unit can be provided as a separate entity that has a data communication path with the data, in one embodiment the data stream processing unit is incorporated at least in part in the data engine. Thus selective parts of the data stream processing unit can be moved into the data engine. For example, a barrel shifter that is part of data access registers of the data stream processing unit could be merged with a barrel shifter of an arithmetic logic unit (ALU) of the data engine.

According to a second aspect, the present invention provides a data stream processing unit for providing a data communication path between a main processing unit operable to perform a plurality of data processing tasks and a data engine having a data engine core operable to perform a number of said plurality of data processing tasks on behalf of said main processor, said data stream processing unit having:
 a control interface operable to receive from said data engine core at least one command; and
 a data stream controller operable to receive at least one input data stream and to perform at least one operation on said at least one input data stream to generate at least one output data stream comprising a sequence of data elements;
wherein said data stream processing unit is responsive to said at least one command from said data engine core to control said data stream controller to perform said at least one operation.

According to a third aspect, the present invention provides a data processing method comprising:
 allocating a plurality of data processing tasks to a main processor;
 performing a number of said plurality of data processing tasks on behalf of said main processor using a data engine having a data engine core;
 providing a data communication path between said main processing unit and said data engine core using a data stream processing unit;
 receiving at said data stream processing unit at least one command from said data engine core;
 receiving at a data stream controller of said data stream processing unit at least one input data stream;
 performing at least one operation on said at least one input data stream to generate at least one output data stream comprising a sequence of data elements;
wherein said data stream processing unit is responsive to said at least one command from said data engine core to control said data stream controller to perform said at least one operation.

According to a fourth aspect, the present invention provides a data processing system comprising:
 a main processor operable to perform a plurality of data processing tasks;
 a data engine having a data engine core operable to perform a number of said plurality of data processing tasks on behalf of said main processor;
 a data stream processing unit providing a data communication path between said main processing unit and said data engine core, said data stream processing unit having:
  a control interface operable to receive from said data engine core at least one command; and
  a data stream controller having a first interface to at least one data stream and a second interface to at least one data element stream comprising a sequence of data elements, the data stream controller being operable to perform at least one operation to manage data transfer between said first and said second interfaces;
 wherein said data stream processing unit is responsive to said at least one command from said data engine core to control said data stream controller to perform said at least one operation.

According to a fifth aspect, the present invention provides a data stream processing unit for providing a data communication path between a main processing unit and a data engine core, said data stream processing unit comprising:
 a control interface operable to receive from said data engine core at least one command; and
 a data stream controller having a first interface to at least one data stream and a second interface to at least one data element stream comprising a sequence of data elements, the data stream controller being operable to perform at least one operation to manage data transfer between said first and said second interfaces;
wherein said data stream processing unit is responsive to said at least one command from said data engine core to control said data stream controller to perform said at least one operation.

It will be appreciated that embodiments of the data stream processing unit according to the present invention may comprise one or more of any of the relevant optional features described above in relation to the data processing system.

According to a sixth aspect, the present invention provides a data processing method comprising:
 allocating a plurality of data processing tasks to a main processor;
 performing a number of said plurality of data processing tasks on behalf of said main processor using a data engine having a data engine core;
 providing a data communication path between said main processing unit and said data engine core using a data stream processing unit;
 receiving at said data stream processing unit at least one command from said data engine core; and
 performing at least one operation to manage data transfer between a first interface to at least one data stream and a second interface to at least one data element stream of a datastream controller;
wherein said data stream processing unit is responsive to said at least one command from said data engine core to control said data stream controller to perform said at least one operation.

A data element stream is a stream of "values" which are meaningful in the scope of the instruction set architecture of the data engine core with which the data stream processing unit is associated. i.e. elements on which operations can be performed by using instructions and resources. A data element can consist of one or more bits, and in one embodiment may comprise a syntax element defined by a standard. One such example of a syntax element would be a Huffman word.

A syntax element can be structured as defined according to any one of a number of different international standards such as: ISO-IEC 11172-3 MPEG 1 audio; ISO-IEC 13818-3 MPEG 2 audio; ISO-IEC 13818-7 MPEG 2; AAC audio; ISO-IEC 14496-3 MPEG-4 AAC twinVQ audio etc; ISO-IEC 11172-2 MPEG 1 video; ISO-IEC 13818-2 MPEG 2 video; ISO-IEC 14496-2 MPEG-4 video; H.261, H.262, H.263, H.264 video and VC1.

A data stream is a stream of "patterns" which are meaningful in the scope of the physical architecture of the hardware devices found in a sub-system layer (of which the data stream processing unit is part) surrounding the data engine, or the fabric surrounding the sub-system. For example the patterns comprise data portions (i.e. quantities or atomic units) that would be transported across a bus or stored in memory rather than syntax elements. A data stream consists of a differently defined portions of data from the portions of data comprising the data element stream.

The above, and other objects, features and advantages of this invention will be apparent from the following detailed description of illustrative embodiments which is to be read in connection with the accompanying drawings.

BRIEF DESCRIPTION OF THE DRAWINGS

FIG. 5 schematically illustrates logic used within the data stream processing unit 150 to manage input and output of data elements of a data stream as they pass through;

FIG. 9A schematically illustrates the format of a portion of an MP3 audio data stream;

FIG. 9B schematically illustrates a sequence of data manipulations (or processing tasks) performed on the input data stream portion of FIG. 9A by the data engine core and the data stream processing unit of FIG. 3.

DESCRIPTION OF THE PREFERRED EMBODIMENTS

Figure 1:
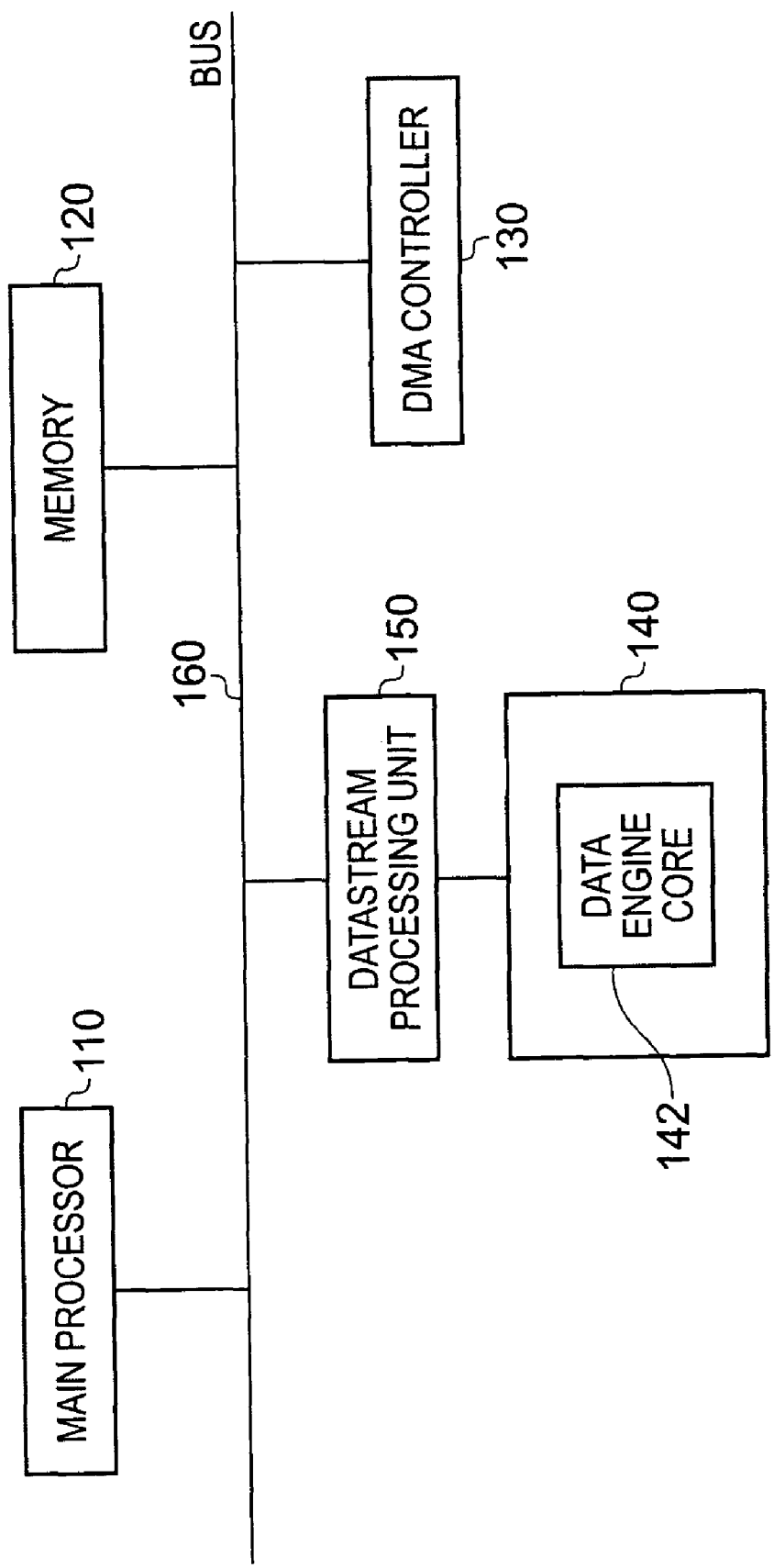
FIG. 1 schematically illustrates a data processing system.

FIG. 1 schematically illustrates a data processing system. The system comprises: a main processor 110; a memory 120; a direct memory access (DMA) controller 130; a data engine 140 comprising a data engine core 142; a data stream processing unit 150; and a system bus 160.

The data stream processing unit 150 is situated between the data engine 140 and the system bus 160 and is operable to perform processing tasks under control of the data engine core 142. The data engine core 142 of the data engine 140 is configured to perform a subset of processing tasks on behalf of the main processor 110 and can be considered to be a loosely coupled coprocessor. The data engine core 142 is loosely coupled in the sense that it is not integral with the main processor 110 and synchronisation between the data engine core 142 and the main processor 110 is performed only at a process or task level. In this arrangement, the data engine core 142 has access to some resources that are shared by the main processor 110. In particular, access to the DMA controller 130 and to the memory 120 is shared.

The data engine core 142 is operable to execute a set of instructions on behalf of the main processor 110 and to generate, upon execution of at least a subset of the set program instructions, at least one command (e.g. a control signal), which it directs to the data stream processing unit 150. In response to this command, the data stream processing unit 150 is controlled to execute one or more data stream processing tasks. The data stream processing unit 150 is configurable to receive one or more input data streams from the memory 120 via the bus 160 and under the control of the DMA controller.

The data stream processing unit 150 is operable to perform manipulations on input data streams to generate one or more output data streams. In order to perform these data stream manipulations, the data stream processing unit 150 has access to a buffer memory (not shown). In this particular arrangement, the buffer memory comprises a portion of the memory 120. In alternative arrangement the buffer memory is provided locally within the data stream processing unit 150. The manipulations performed by the data stream processing unit 150 enable, for example, out-of-order access to an input data stream or splicing of portions of at least two input data streams to produce a single output data stream. The data stream processing unit 150 is configurable by the main processor 110 with configuration information such as, for example, the buffer size and location, start and end addresses for the buffer memory and properties of the DMA controller 130.

In FIG. 1, the combination of the data stream processing unit 150 and the data engine 140 provides for data stream processing having improved performance and reduced complexity, both from a programming and from an integration point of view. The data stream processing unit 150 and data engine 140 effectively act as a DMA slave device capable of processing data streams without the need for any further interaction from the host system. The Application Program Interface (API) offered by the data engine core 142 for performing data stream processing tasks provides functions for variable-length bit-stream access with automatic data alignment as well as stream buffering and rewind functions for the out-of order access to bitstreams. Such out-of-order access is common in Constant Bit-Rate (CBR) audio coding algorithms.

Figure 2:
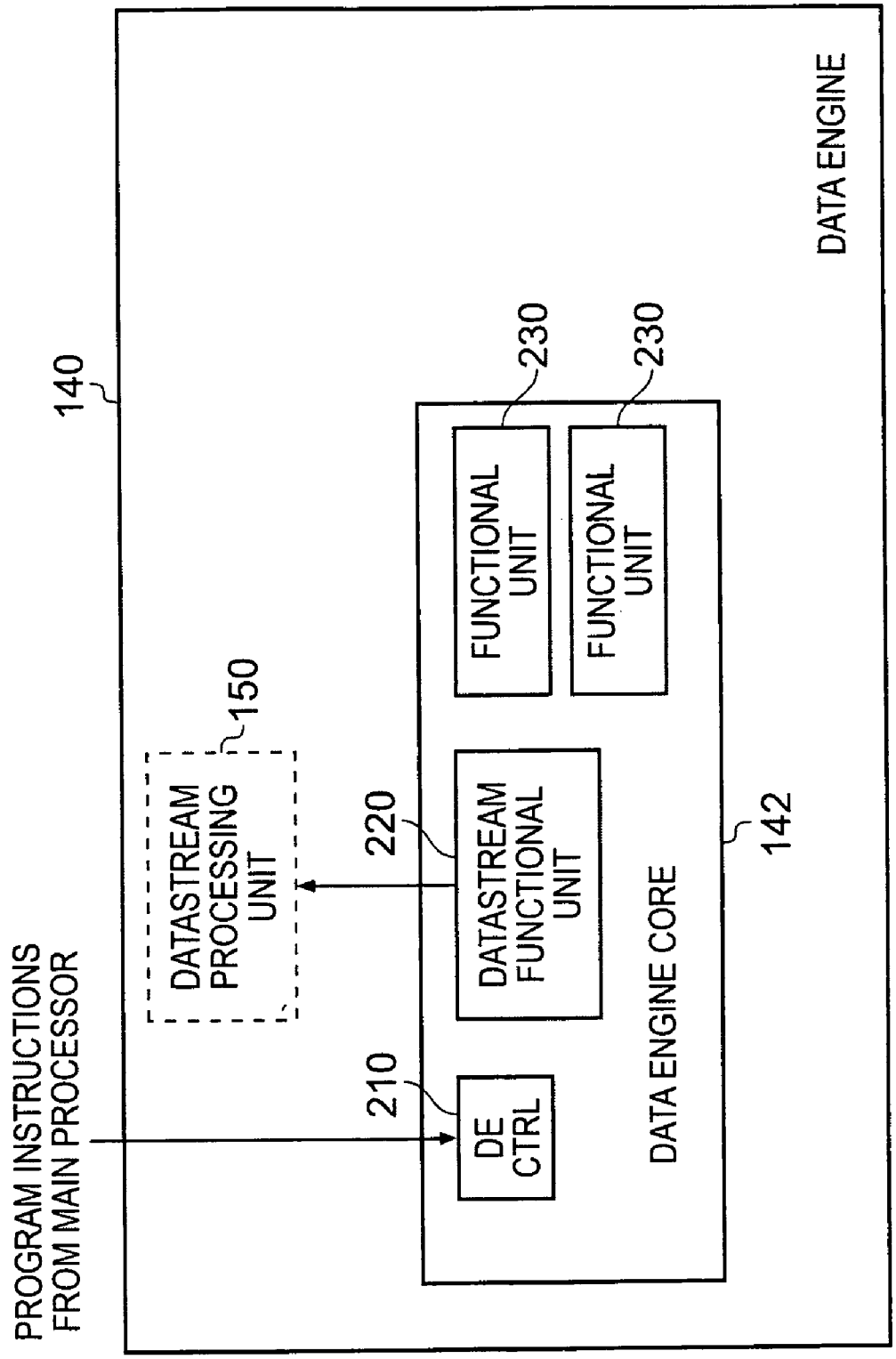
FIG. 2 schematically illustrates the data engine of FIG. 1 in more detail.

FIG. 2 schematically illustrates the data engine 140 of FIG. 1 in more detail. In FIG. 1, the data stream processing unit 150 is provided externally to the data engine 140. However, in alternative arrangements, the data stream processing unit 150 can be integrated as a component of the data engine 140. This is indicated in FIG. 2 by the dashed lines of the data stream processing unit 150. The data engine core comprises a data engine controller 210 and a data stream functional unit 220 and a plurality of other functional units 230. The data engine controller 210 is operable to receive from the main processor 110 (see FIG. 1), program instructions for execution and is configured to dispatch each instruction to an appropriate one of the data stream functional unit 220 and the plurality of functional units 230 for execution.

The data engine controller 210 issues control signals that lead to movement of data within the data engine core 140 and issuance of program instructions for execution by the data stream functional unit 220 or the other functional units 230. Execution of these instructions can use data or yield data.

The data stream functional unit 220 and the plurality of other functional units 230 are each operable to execute at least one program instruction on behalf of the main processor 110. Different ones of the functional units 230 are dedicated to performing different processing tasks. The data stream functional unit 220 is a particular type of functional unit configured to execute instructions, which generate commands that are routed to the data stream processing unit 150. The commands (in this case control signals), which are supplied as input to the data stream processing unit 150 by the data stream functional unit 220, control the data stream processing unit 150 to perform tasks including access to and manipulation of input data streams. Examples of data streams to be processed include, without limitation, video data and audio data in compressed and/or encoded form.

Figure 3:
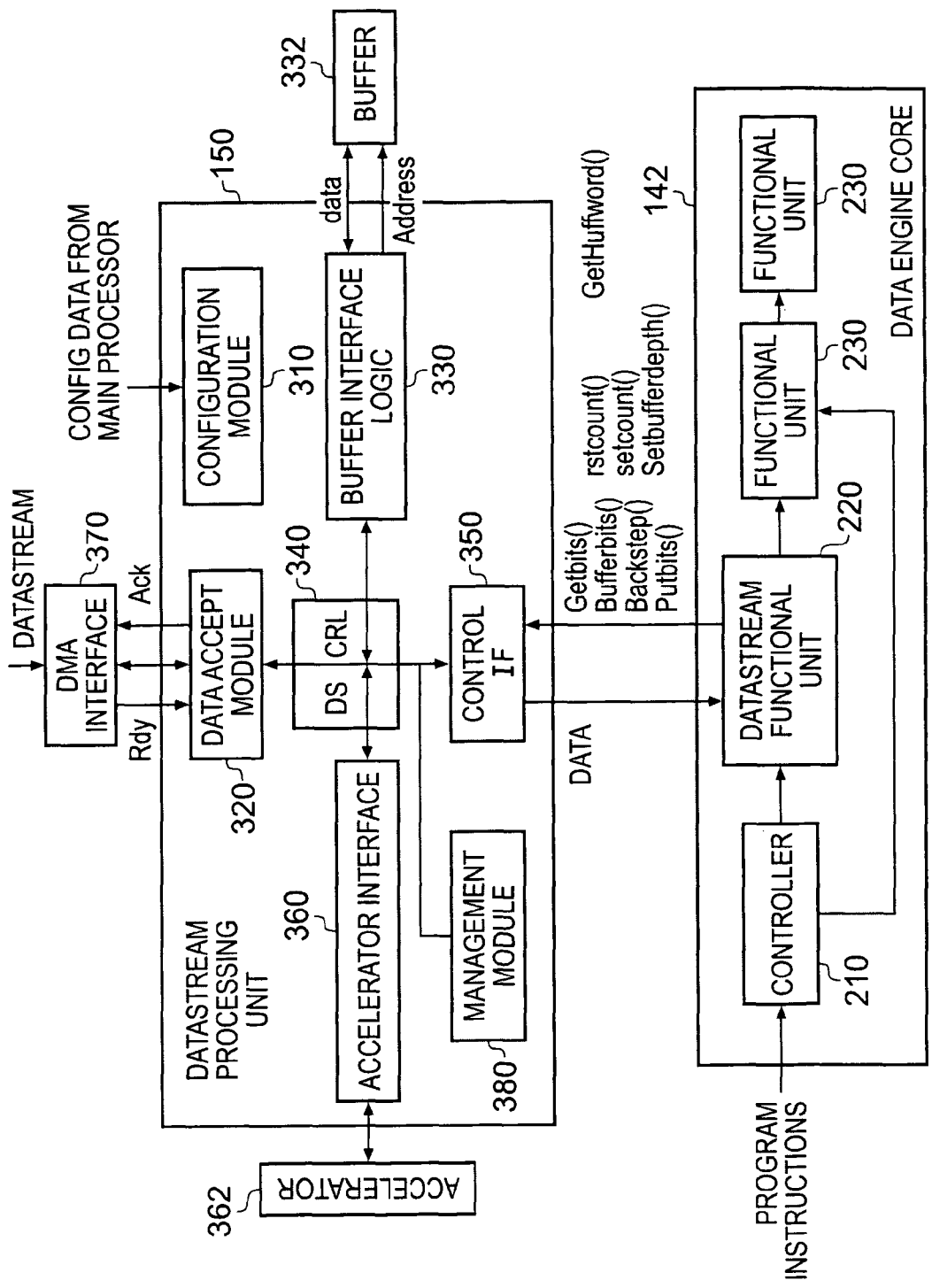
FIG. 3 schematically illustrates the logic within the data stream processing unit of FIG. 1 and how the data stream processing unit interfaces with the data engine core.

FIG. 3 schematically illustrates the logic within the data stream processing unit and how the data stream processing unit 150 interfaces with the data engine core 142. The data stream processing unit comprises: a configuration module 310; a data accept module 320; a buffer interface 330; a data stream controller 340; a control interface 350; and an accelerator interface 360 providing access to an accelerator 362. The data accept module 320 is configured to communicate with a DMA interface 370. The buffer interface 330 provides a data communication path with an external buffer 332.

The data stream processing unit 150 also has a management module 380, which stores management data in a management record. The management record in this embodiment is a file stored locally by the management module 370, but in alternative arrangements the management record is a file stored in memory external to the data stream processing unit 150. The management record is accessible by the data stream controller 340 via the management module 380. The management data includes, without limitation, pointers to data stored in the buffer and marker data that marks the beginning and end of header sections. Note that in this description, the term module and the term logic will be used to refer components that can comprise hardware elements, software elements or a combination thereof.

The data accept module 320 communicates with the DMA interface 370 via a handshaking protocol and is operable to receive one or more input data streams via the DMA interface 370. The data accept module 320 is illustrated in more detail in FIG. 3. The configuration module 310 is programmed by the main processor 110 with configuration information including properties of the buffer 332, properties of the DMA controller 130 (see FIG. 1) that is accessible via the DMA interface 370 and properties of the accelerator processing module 362 accessible via the accelerator interface 360.

By programming the configuration module 310 of the data stream processing unit 150 with such configuration information, details of the implementation of the buffering performed by the data stream processing unit 150 can be hidden from the programmer. This is because the data stream processing unit 150 can manage the buffering processes performed in response to execution of program instructions by the data stream functional unit 220 in dependence upon the configuration information stored in the configuration module 310. Thus the requirement to explicitly specify buffer locations in which to store and from which to retrieve buffered data in program instructions executed by the data stream functional unit 220 is obviated.

The control interface 350 is in direct communication with the data stream functional unit 220 and receives control signals that are output by the data stream functional unit 220. The data engine core 142 receives a subset of program instructions from the main processor and the data engine 142 is responsible for performing the processing tasks associated with those program instructions. The controller 210 executes the program instructions to generate control signals. The controller 210 allocates processing tasks to the data stream functional unit 220 and to the other functional units 230. It will allocate at least some processing tasks associated with data stream handling to the data stream functional unit 220. In particular, the controller 210 sends control signals to the data stream functional unit 220 to perform a subset of processing tasks. The data stream functional unit 220 in turn sends control signals to the control interface 350 of the data stream processing unit 150.

The data stream controller 340 controls the manipulations performed on the input data streams in dependence upon commands received from the data stream functional unit 220 via the control interface 350. The data stream controller 340 is operable to direct some data elements (e.g. bits, bytes or words) of an input data stream to the buffer interface 330 for temporary storage in the buffer 332. The data stream controller 340 has a plurality of interfaces comprising the data accept module 320, the accelerator interface 360, the buffer interface logic 330 and the control interface 350. The data stream controller 340 supports data flow in both directions such that it can perform operations on one or more input data streams to generate one or more output data elements streams or alternatively can perform operations on one or more input data elements streams to deliver output data streams. Recall that a data elements stream is a stream of values that are meaningful in relation to the instruction set architecture of the data engine core with which the data stream processing unit 150 is communicating i.e. elements on which operations can be performed using instructions and resources. An example of a data element is a syntax element defined by an international standard. The accelerator 362 is operable to process syntax elements of data streams such as multimedia data streams.

The programmer, who provides the program instructions for execution by the data stream functional unit 220 (together with a sequence of instructions executable by the main processor 110), need have no knowledge of the properties of the buffer such as the location, current occupancy or storage addresses to be used for data supplied to the buffer, since the data stream processing unit 150 is autonomous in this respect. The autonomy of the data stream processing unit 150 is due at least in part to the fact that it stores configuration data in the configuration module 310 specifying details of associated data processing resources such as the buffer 332, the accelerator 362 and the DMA controller 130.

The configuration module 310, although accessible by the main processor 110 (see FIG. 1) and other processing elements connected to the bus 160, is not accessible by the data engine 140. Furthermore, the data stream processing unit 150 maintains a management record via the management module 380, which keeps track of: how many data elements of each input data stream have been received by the data accept module 340; which data elements of each input data stream are currently stored in the buffer 332; and which data elements of the input data streams have already been output via the control interface 350 or the accelerator interface 360.

The accelerator interface 360 provides an input/output data communication path with the accelerator 362. The accelerator 362 is configured to perform a range of specialized processing tasks rapidly and efficiently. In this particular arrangement, the accelerator is configured to perform Huffman coding/decoding of data streams. The accelerator 362 is operable to perform data stream coding/decoding in response to a command supplied by the data stream functional unit 220 received via the control interface 350. In response to this accelerator command (or sequence of commands), the data stream processing unit 150 operates autonomously both to retrieve the data elements to be operated on by the accelerator 362 and to perform encoding/decoding of those data elements.

As shown in FIG. 3, the data engine core 142 is operable to execute an instruction set comprising a plurality of instructions and to generate control signals to the control interface 350 in response to execution of each instruction. The instruction set executable by the data engine core 142 comprises:
 (i) a getbits( ) instruction for retrieving specified data elements from an input data stream;
 (ii) a bufferbits( ) instruction for directing the data stream controller 340 to buffer specified data elements of an input data stream;
 (iii) a backstep( ) instruction for gaining out-of-order access to data of a data stream by retrieving previously buffered data elements of a data stream after subsequent data elements have already been supplied to an output data stream;
 (iv) a putbits( ) instruction operable to insert data from the data engine into a the data stream processing unit for insertion into a data stream;
 (v) a setcount( ) instruction for setting a counter that keeps track of data within the data stream processing unit 150;
 (vi) a rstcount( ) instruction for resetting the counter;
 (vii) a setbufferdepth( ) instruction for setting the depth of the buffer 332;
 (viii) a get Huffword( ) instruction for autonomous retrieval of a syntax element from the data stream. The syntax element may comprise multiple data elements;
 (ix) an unbufferbits( ) instruction for removing data from the buffer; and
 (x) a peakbits( ) instruction enabling access to a limited number of bits from the data stream without progressing the stream itself or the bit pointer.
 For example, buffering on output can be achieved by executing a backstep( ) instruction followed by a putbits( ) instruction followed by an unbufferbits( ) instruction.

In one alternative arrangement, the datastream processing unit is operable to perform the basic functionality of taking one data stream (either input or output) and converting it into another differently formatted data stream. In this case the only instructions that would be required from the above list are the getbits( ) instruction for input streams and the putbits( ) instruction for output streams.

All of the instructions executed by the data engine core 142 and which result in commands being sent from the data stream functional unit 220 of the data engine to the data stream processing unit 150 via the control interface 350 are either: (a) conditionally returning instructions or (b) unconditionally returning instructions. The unconditionally returning instructions (e.g. getbits( )) are such that they are not dependent on lock conditions of any other process whether internal or external. As such, these instructions are guaranteed to return. On the other hand, conditionally returning instructions can be dependent upon lock conditions and so a corresponding abort( ) instruction is provided for these instructions to prevent a deadlock. Note that although the getbits( ) instruction is an unconditionally returning instruction it will stall in the event that the required data is not available.

The setcount( ) and resetcount( ) instructions are specifically provided to make data stream access safer. For example, in the ISO.IEC 11172-3 and 13818-3 (MPEG1,2 audio) standards, it is defined that a certain number of bits is read but there is no guarantee that the quantity of data that is read will correspond to an integer number of data elements (e.g. syntax elements) or that it will correspond to a complete number of processing steps in a processing loop. In order to avoid costly "break" instructions, the setcount( ) instruction allows the data stream processing unit 150 to provide a specified number of bits and to produce zero and an exit condition afterwards. This ensures that the code will exit at the end of the loop.

Output data streams generated by the data stream processing unit 150 are sent to the data engine 140 via the control interface 350. The data received by the data engine 140 from the data stream processing unit 150 is stored in a register (not shown) in the data engine 140.

Command signals generated by execution of each of the above program instructions are supplied to the data stream processing unit 150 by the data engine core 142 via the control interface 350. Execution of each instruction by the data engine core 142 triggers a processing task in the data stream processing unit 150. The control interface 350 is the port via which independent processes (e.g. bufferbytes( ), getbits( ) etc.) are launched and terminated. Each independent process has its own state machine.

The DMA interface 370 and the data accept module 320 or the buffer interface logic 330 perform actions in response to receipt of data from an input data stream whereas the control interface 350 is responsive to commands received (typically asynchronously with respect to receipt of an input data stream) from the data engine core 142 to control the data stream processing unit 150 to perform operations on the input data stream. Thus, for example, the DMA interface 370 is configured to respond to bus signals even if there is no corresponding command received via the control interface 350. Thus actions of the data stream processing unit require co-ordination and this co-ordination is performed using a state machine. If a bufferbytes( ) operation is being performed by the data stream processing unit 150 such that data is being transported from the data accept module 320 to the buffer interface logic 330 then a getbits( ) instruction that is received via the control interface 350 whilst the buffering is ongoing cannot be handled concurrently with the buffering. The buffering will continue regardless of receipt of the getbits( ) command. Interruption of buffering, which involves memory access would result in wasteful power consumption and could also result in functionally incorrect behavior due to dependencies between commands. The state machine prevents the buffering operation from stalling on receipt of a getbits command. A further example of the use of a state machine is a state machine associated with a bufferbytes( ) operation. During a buffering operation, the buffer interface logic 330 raises a write enable signal for writing data to the associated buffer 332. However, if the buffering operation is stalled due to use of the buffer 332 by some other process that takes precedence over the use of the buffer 332 by the data stream processing unit 150 then it could be the case that the write enable signal to the buffer 332 remains raised for the duration of the stall. This would waste a significant amount of power. To prevent this, a state machine associated with the buffering process is operable to lower the write enable signal for the duration of any stall and to re-activate the write enable signal when the buffer 332 becomes available again.

The control interface 350 supports a set of instructions (executed by the dataengine core 142) that enable the current state of the data stream processing unit 150 and the processes running on it to be set, reset, saved and restored.

Figure 4:
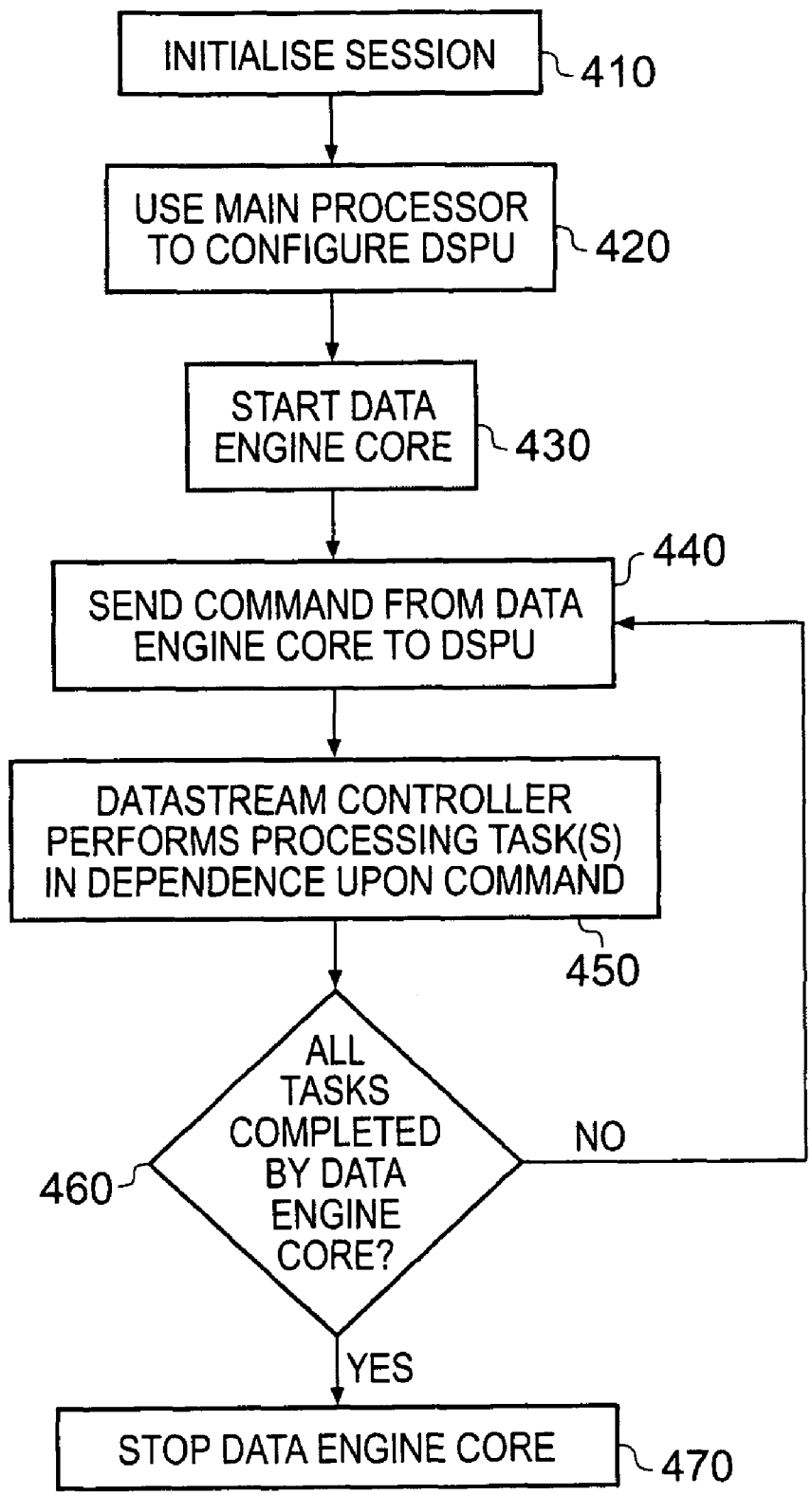
FIG. 4 is a flow chart that schematically illustrates how a sequence of data stream processing tasks is performed by the data processing apparatus of FIG. 1.

FIG. 4 is a flow chart that schematically illustrates how a sequence of data stream processing tasks is performed by the data processing apparatus of FIG. 1. The session is initialized at stage 410 whereupon the data processing apparatus is booted up. Next, at stage 420, the main processor 110, having determined the characteristics of the data processing resources available to it at boot-up, sends configuration information to the configuration module 310 (see FIG. 3) of the data stream processing unit 150 specifying properties of any buffering resources available via the buffer interface 330 and any processing resources available via the accelerator interface 360.

The configuration information stored by the configuration module 310 is not accessible to the data engine 140. Once the configuration module has been configured at stage 420, the data engine core 142 is started and becomes available to the main processor 110 to perform a subset of processing tasks on its behalf.

At stage 430 the data engine core 142 receives program instructions and dispatches (at least some of) these instructions to the data stream functional unit 220 (see FIG. 2) for execution. The data stream functional unit 220, in response to execution of a given program instruction outputs at least one command to the data stream controller 340 via the control interface 350 to perform a data processing task on data elements of one or more input data streams. The data processing tasks that can be performed involve data manipulations that require buffering of data elements. For example, out-of-order stream access or data stream splicing (i.e. concatenation of portions of two or more input data streams to form an output data stream). After the tasks associated with execution of a given instruction executed by the data stream functional unit 220 have been completed, the process proceeds to stage 460.

At stage 460 it is determined whether all data stream processing tasks received via the data engine core controller 210 have been completed. If further tasks have still to be performed then the process returns to stage 440. However, if all processing tasks have already been completed at stage 460, then the process proceeds to stage 470 whereupon the data engine core is stopped. Note that in the flowchart of FIG. 4, it is assumed for the purposes of illustrated that all program instructions received by the data engine controller 210 are destined for the data stream functional unit 220. However, it will be appreciated that some instructions, which do not involve data stream manipulation are in fact directed to the other functional units 230 for execution rather than to the data stream functional unit 220.

Figure 5:
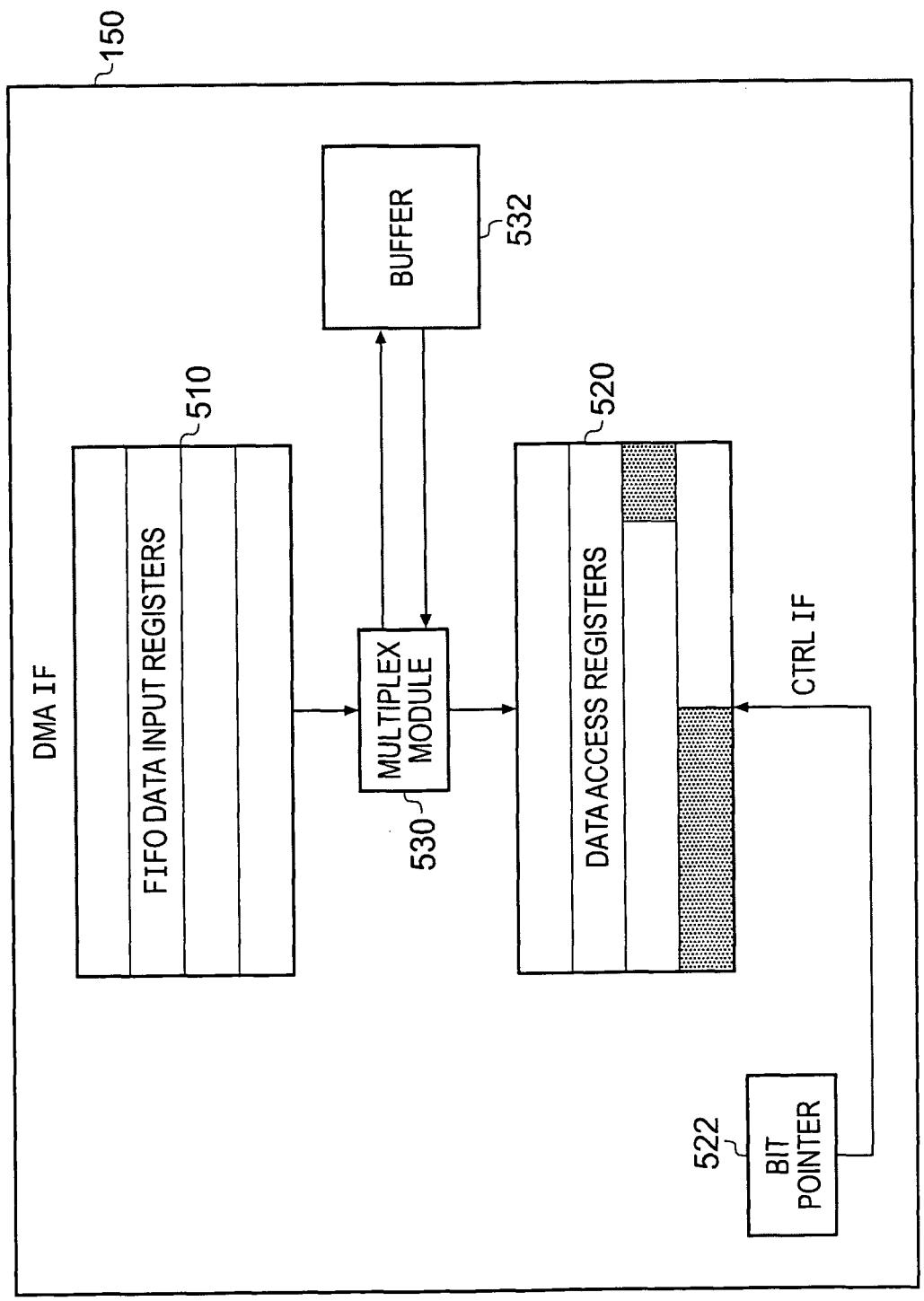

FIG. 5 schematically illustrates logic used within the data stream processing unit 150 to manage input and output of data elements of a data stream as they pass through. The logic comprises: a set of data input registers 510 (which are part of the data accept module 320 of FIG. 3); a set of data access registers 520 and an associated bit pointer 522 (which are both constituents of the control interface 350 of FIG. 3); a multiplexing module 530 (which forms part of the data stream controller 340 of FIG. 3) which has a bi-directional data communication path that links it to an associated internal buffer 532. Note that the Arrangement of FIG. 5 is an alternative to the arrangement of FIG. 3 in that the buffer 332 of FIG. 3 is internal to the data stream processing unit 150 whereas the buffer 532 of FIG. 5 is external to the data stream processing unit 150.

Data elements of an input data stream that are received via the DMA interface 370 (see FIG. 3) are temporarily stored on a first-in-first-out (FIFO) basis in the data input registers 510. The FIFO nature of the data input registers 510 enables data streams to be accessed sequentially via the DMA interface 370. The management module 380 (see FIG. 3) keeps track of how many data elements have been received and which data elements still reside in the data input registers 510. Data elements are output from the data input registers 510 and supplied to the multiplexing module 530. In dependence upon commands received from the data stream functional unit 220 via the control interface 350 (see FIG. 3), the multiplexing module 530 directs some data elements from the data input registers 510 to the buffer 532 for temporary storage and directs others of the data elements from the data input registers 510 directly to the data access registers 520 of the control interface 350, where they are accessible to the data engine core 142. The data stream processing unit 150 maintains management information comprising at least one reference position in the input data stream. This reference position corresponds to the state of a state-machine associated with the data access registers 520 in FIG. 5. The data input registers 510 also have an associated state machine storing reference position information associated with the data input process. The fact that the data stream processing unit 150 is capable of storing at least one reference position with regard to a data stream effectively means that it is capable of storing state information. This allows for execution of the getbits( ) instruction (as described above) to automatically retrieve bits from a data stream. The stored state information also enables the data stream processing unit 150 to automatically select from which port (i.e interface associated with data input registers 510 or interface associated with buffer 532) to obtain or write the data.

The multiplexing module 530 is also operable, in response to commands generated in response to execution of the getbits( ) instruction to retrieve from the buffer 532, buffered data elements of the input data stream for output to the data access registers 520. Again, the management module 380 keeps track of which data elements are still in the buffer and where they are located and also keeps track of which data elements are present in the data access registers 520. An output data stream is created by selectively outputting data elements from the data access registers 520 onto a transmission stream using the putbits( ) instruction.

The bitpointer 522 points to a data element to be supplied next to an output data stream. To reset the bitpointer a resetbitpointer( ) or reset( ) instruction is used. The data access registers 520 of FIG. 5 automatically selects the reference position in the data stream that is used as a reference point by the data stream processing unit 150 when acting on a command from the data engine core. The data stream processing unit 150 maintains management information including this reference position. The management information also comprises a record of which data elements have been stored in the buffer 532 and which data elements have been received at the data input registers 510 via the DMA interface. As discussed above with reference to FIG. 3, the DMA interface 370, the accelerator interface 360, the buffer interface 330 and the control interface 350 all have associated state machines. Accordingly, the management information can be distributed/ assigned to the stste machines of the respective interfaces so that e.g. the state machine associated with the buffer interface 330 stores the management information specifying which data elements have been stored in the associated buffer 332.

Figure 6:
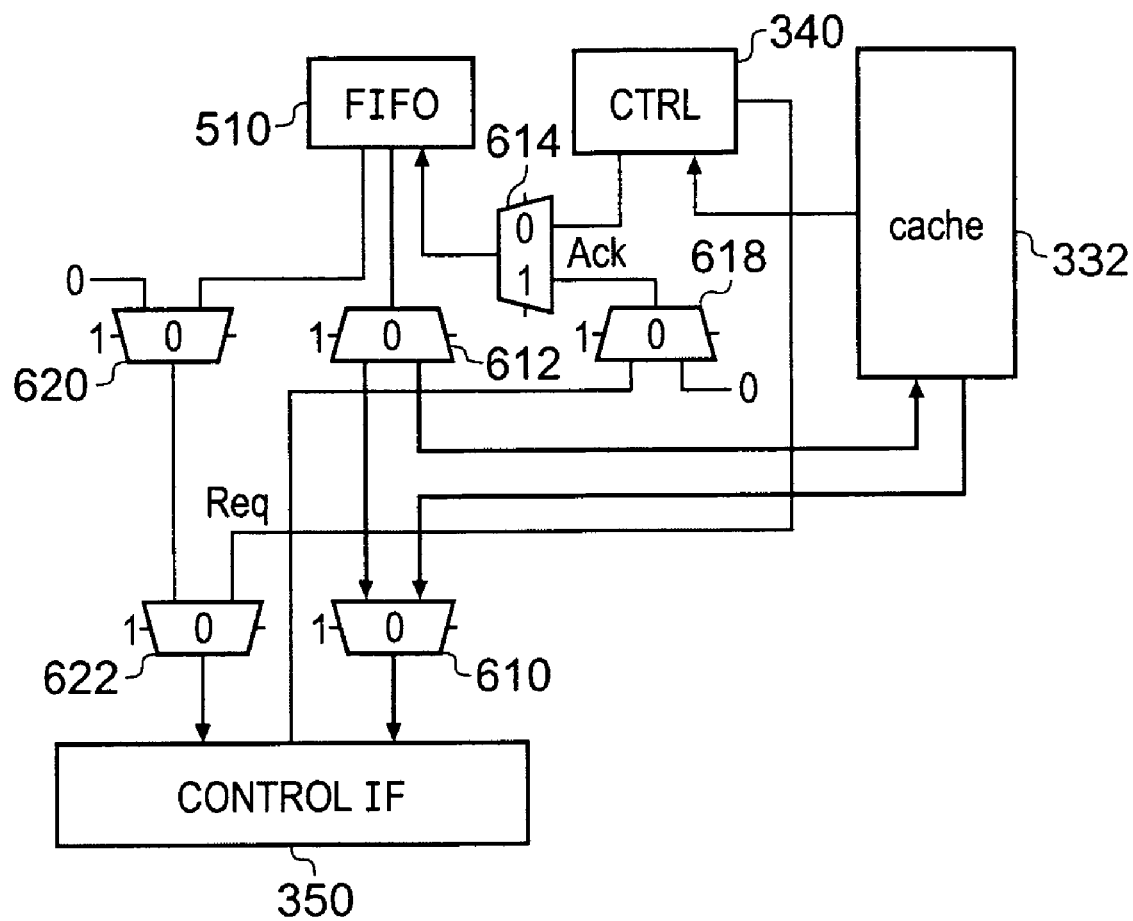
FIG. 6 schematically illustrates logic that controls flow of data through the data stream processing unit.

FIG. 6 schematically illustrates logic that controls flow of data through the data stream processing unit. This logic is operable to multiplex data elements from the buffer 532 (see FIG. 4) and from the input data registers. The arrangement of FIG. 6 corresponds to a data path from the DMA interface 370 through to the control interface 350 of FIG. 3. The multiplexers 610 and 612 are associated with the data path whereas multiplexers 614, 618, 620 and 622 are associated with the control path. Multiplexer 610 controls whether buffered data from the buffer 332 or data directly from the FIFO data input registers 510 is supplied to the data engine 140 via the control interface 350. Multiplexer 612 controls whether data from the FIFO input registers 510 is supplied directly to the control interface 350 for output or alternatively to the buffer 332 for temporary storage. Data portions will be buffered and output in response to commands from the data stream functional unit 220 (see FIG. 2). The multiplexers 614 and 618 are operable to receive an ACK signal from the data engine core (see FIG. 3) via the control interface 350. The multiplexers 620 and 622 are operable to output a request signal to the data engine core 142 via the control interface 350. If no data is arriving at the FIFO 510, then the FIFO outputs a pending signal which arrives at the control interface 350 via the multiplexers 620 and 622. The pending signal causes the data engine controller 210 (see FIG. 3) to stall. On the other hand if a data stream is being supplied to the FIFO 510 then an acknowledge signal will pass from the data engine core 142 to the FIFO 510 via the control interface 350 and the multiplexers 614 and 618. The main data path, which connects the FIFO 510 to the control interface 350 via the multiplexers 610 and 612 can be set up to: (i) pass data straight through from the input FIFO 510 to the control interface 350 for consumption by the data engine 140; (ii) read data from the buffer 332; (iii) buffer data from the input FIFO 510 for storage in the cache 332. The request/acknowledge multiplexers 614, 618, 620 and 622 have to follow suit. For example, in buffering mode, when data from FIFO 510 is being supplied to cache 332, a zero signal input will be placed on the request control path 620, 622 to ensure that any request for data by the data engine 140 while the buffering is in progress will result in a stall. For simplicity, the circuit shown in FIG. 6 does not show all of the circuit elements associated with the control of data flow. For example, further circuit elements (not shown) are provided to provide an acknowledge signal to the controller 340 acknowledging arrival of data at the data engine 140.

Figure 7:
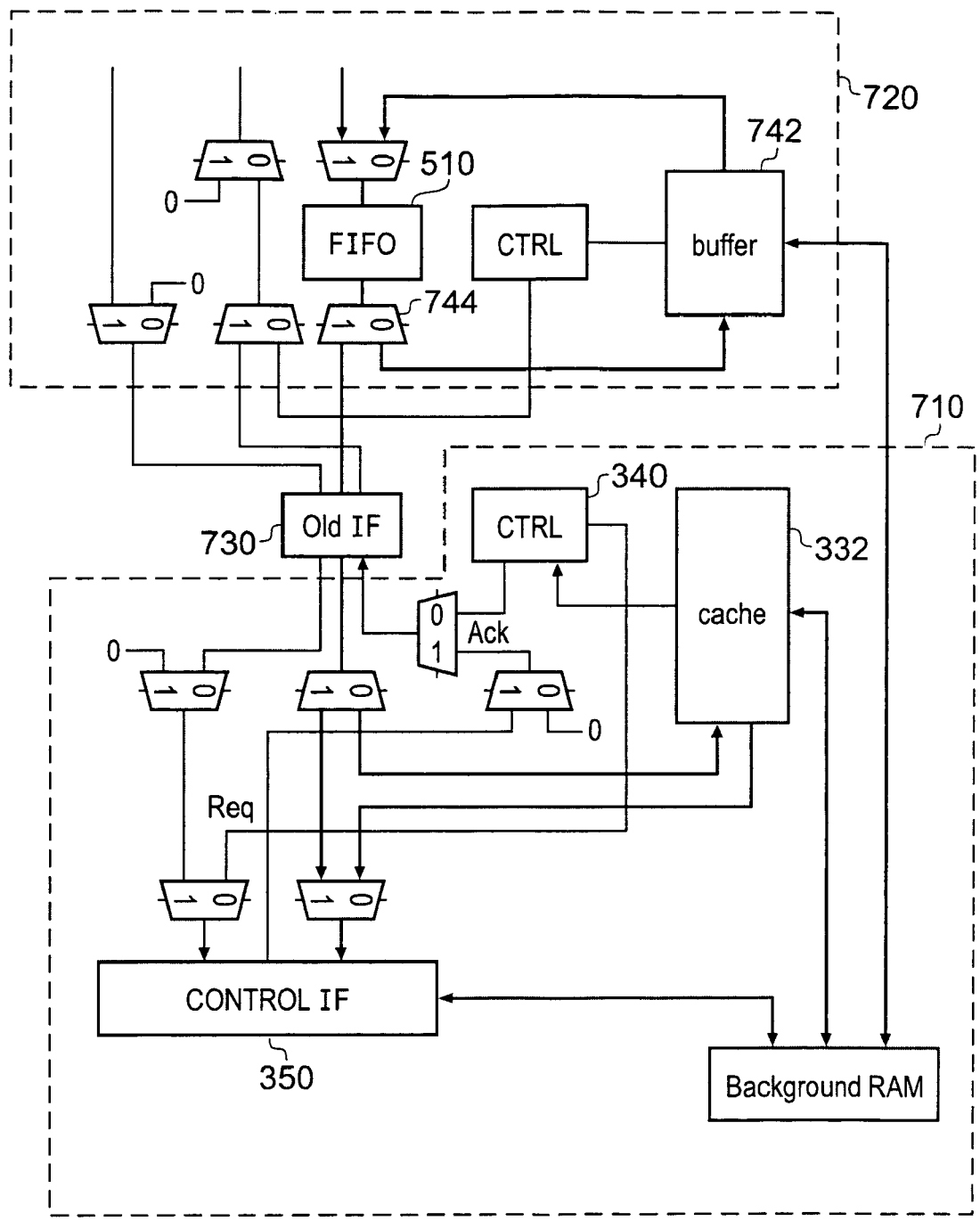
FIG. 7 schematically illustrates logic that controls flow of data through the data stream processing unit and is also operable to store pending data in transfer when a data transfer has been aborted.

FIG. 7 schematically illustrates logic that controls flow of data through the data stream processing unit and is also operable to store pending data in transfer when a data transfer has been aborted. This arrangement is an alternative arrangement to that of FIG. 6. The lower portion 710 of the circuitry is identical in both form and function to the circuitry of FIG. 6. The upper portion 720 of the circuitry is operable to save pending data in transfer. The arrangement of FIG. 7 is useful in the event that the data engine core 142 sends a command to the data stream processing unit 150 (see FIG. 3) to abort a data transfer involving a data stream being supplied to the data accept module 320 via the DMA interface. If the data engine core 142 issues the command to terminate data transfer whilst data is still in transit to the DMA interface 370 then it is desirable to buffer that data although not currently required by the data engine core 142 because otherwise, when the data engine core 142 resumes processing the data stream would likely corrupted if data already output by the DMA controller had simply been discarded. The upper portion 720 of circuitry of FIG. 7 serves to consume the data in transit or "overflow data", which was sent to the data stream processing unit 150 before the stop command from the data engine core 142 had been registered. The overflow data is received by the input FIFO 510 and supplied to a buffer 742 for storage via a multiplexer 744. On resumption of processing by the data engine core 142 the data stored in the buffer 742 is supplied to the lower portion of circuitry 710 for processing via an interface 730 connecting the upper circuit portion 720 to the lower circuit portion 710. The circuitry of FIG. 7 enables a data stream to be aborted without the loss of data. As explained above, the data stream processing unit 150 has state machines associated with (at least) each of its interfaces. It will be appreciated that in the event of a data abort, in order to enable resumption of processing at a later point, the state of the state machines prior to the abort operation is saved.

Figure 8:
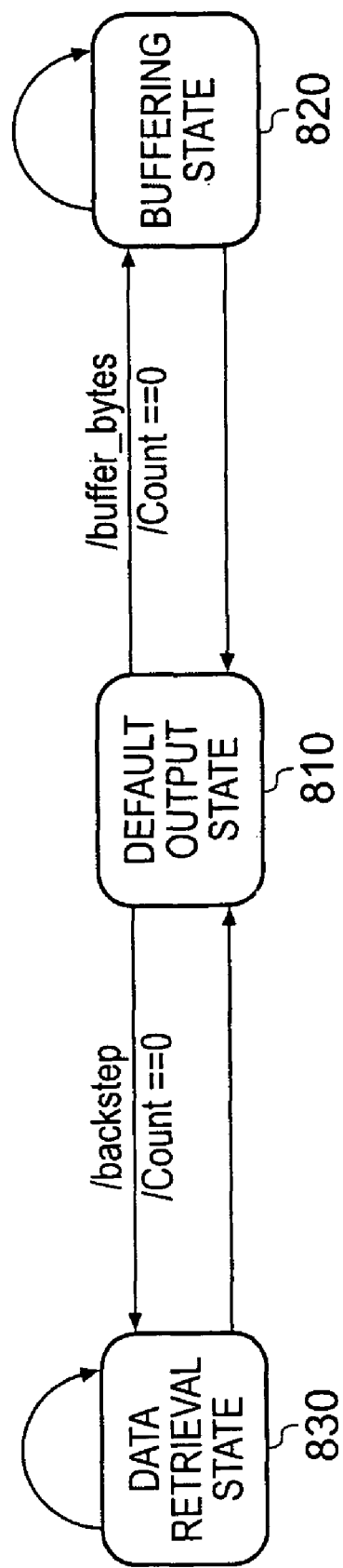
FIG. 8 schematically illustrates a state machine representation of the multiplexing operation performed by the logic of FIG. 6.

FIG. 8 schematically illustrates a state machine representation of the multiplexing operation performed by the logic of FIG. 6.

For the data multiplexing processing task represented by FIG. 8, the data stream processing unit 150 can operate in one of three processing states comprising: a default output state 810; a buffering state 820; and a buffered data retrieval state 830.

In the state 810, data is read directly from the data input registers 510 (see FIG. 4) and supplied to the data access registers 520 ready for transmission onto an output data stream. State 820 is a buffering state in which data read from the data input registers 510 is routed by the multiplexer module 530 to the buffer 532 for temporary storage until such a time as it is required from output. A state transition from state 810 to state 820 is performed in response to a command from the data stream functional unit 220 (see FIG. 3) generated as a result of execution of the bufferbytes( ) instruction. On occurrence of this state transition (from state 810 to state 820) a counter maintained by the management logic 380 is reset and thereafter this counter keeps track of the number of consecutive data elements of the data stream that have been buffered and ensures that the buffering state 820 is entered for the prescribed count. Once the requested number of data elements (e.g. bits, bytes or words) have been buffered in state 820 then a state transition back to the default output state is performed.

If the data stream functional unit 220 (see FIG. 3) executes a backstep( ) instruction when the system is in the default output state 810, then a state transition to the buffered data retrieval state 830 will occur. In the buffered data retrieval state 830, the management module 380 of the data stream processing unit is referred to by the data stream controller 340, to determine the storage location of stored data elements corresponding to an earlier point in the temporal sequence of the input data stream and the data stream controller 340 resets the bit pointer 522 (see FIG. 5) to prepare for output of that stored data into the output data stream. This is how out-of-order access to a given input data stream is achieved. Any request for data from the data engine core 142 when the data stream processing unit 150 is in either the buffering state 820 or the buffered data retrieval state 830 will result in a stall. This stall is effected by supplying a zero to the multiplexer 620 of the arrangement of FIG. 6.

FIG. 9A schematically illustrates the format of a portion of an MP3 audio data stream. The data stream processing unit 150 accesses an input data stream sequentially via the DMA interface 370 using the FIFO data input registers 510 (see FIG. 3). However, the MP3 standard specifies that it is possible during processing of an incoming MP3 data stream to jump back up to 512 bytes in the bitstream to access main data stored in previous frames. MP3 audio corresponds to MPEG 1, layer 3 and MPEG 2 layer 3 audio and relates to the following engineering standards: ISO-IEC 11172-3, ISO-IEC 13818-3)

Note that the 512 bytes excludes header data, cyclic redundancy check (CRC) data and side information. After such a backstep, all header, CRC and side information is skipped. Thus it will be appreciated that up to 512 bytes of payload data may appear in the input data stream before the header and CRC information associated with that payload data have been received. Accordingly, there will be a requirement to buffer this data until some time after the associated header information has been received.

Referring to FIG. 9A, the representative MP3 bitstream portion comprises a total of 66 data elements DS[0:66]. The data stream comprises: a first header portion 910 comprising data elements DS[0:4]; a first payload data portion 920 comprising data elements DS[5:34]; a second payload data portion 930 comprising data elements DS[35:45]; a second header portion 940 comprising data elements DS[46:50] and a third payload data portion 950 comprising data elements DS[51:65].

The first payload data portion 920 is associated with the first header portion 910 whereas both the second payload portion 930 and the third payload portion 950 are associated with the second header portion 940. Since the second payload portion 930 appears at a point in the input temporal sequence prior to receipt of the associated header portion (second header portion 940), it will be appropriate to buffer the second data portion 930 prior to output so that the relevant header information is available when that payload data is processed.

FIG. 9B schematically illustrates a sequence of data manipulations (or processing tasks) performed on the input data stream portion of FIG. 9A by the data engine core 142 and the data stream processing unit 150 (see FIG. 3).

At STEP 1 the first header 910 is read by the data engine 140. This action is performed in response to execution by the data stream functional unit 220 (see FIG. 3) of the getbits( ) instruction with an input argument of five representing five data elements. This results in data elements DS[0:5] being retrieved from the FIFO data input registers 510 and supplied to the data access registers 520 (see FIG. 5) ready for output.

At STEP 2, the first payload data portion 920 is read from the input data registers 510. This is achieved by the data stream functional unit 220 executing the program instruction getbits(30) whereupon data elements DS[5:34] are removed from the input data registers 510 and stored, ready for output in the data access registers 520.

At STEP 3, the second data payload portion 920 is read from the data input registers 510 and supplied to the multiplexing module 530, where it is directed to the buffer 532 for temporary storage. This action is performed by the data stream processing unit 150 in response to execution by the data stream functional unit 220 of the instruction bufferbits (11). The eleven data elements corresponding to DS[35:45] are stored in the buffer. The management module 380 (see FIG. 3) keeps track of which data elements are buffered and the buffer locations at which they are stored.

At STEP 4, the second header portion 940 is read from the input data registers 510 and stored in the data access registers 520 ready for transmission onto an output data stream. Since the data elements of the second payload portion 930 have been buffered at STEP 3, the second header portion will be output directly after the first payload data portion 920.

At STEP 5, the data engine core 142 prepares to access the buffer 532. Accordingly, the data stream functional unit 220 executes the instruction backstep(11) whereupon the bit pointer 522 that controls the current output position of data for supply to the output data stream is rewound such that it corresponds to DS[35] i.e. the start of the second payload portion 35.

At STEP 6 the second payload portion 930 is retrieved from the buffer ready for output from the data access registers 520. Since the bit pointer 522 was reset in STEP 5, this data can be added to the output data stream by execution of the instruction getbits(11) by the data stream functional unit 220.

Finally, at STEP 7, the third payload portion 950, which (like the second payload portion 930) is associated with the second header portion is read from the input data registers 510 and stored in the data access registers 520 ready for output. This is achieved by execution of the instruction getbits (15) by the data stream functional unit 220, in response to which data elements DS[51:65] are output.

Figure 10:
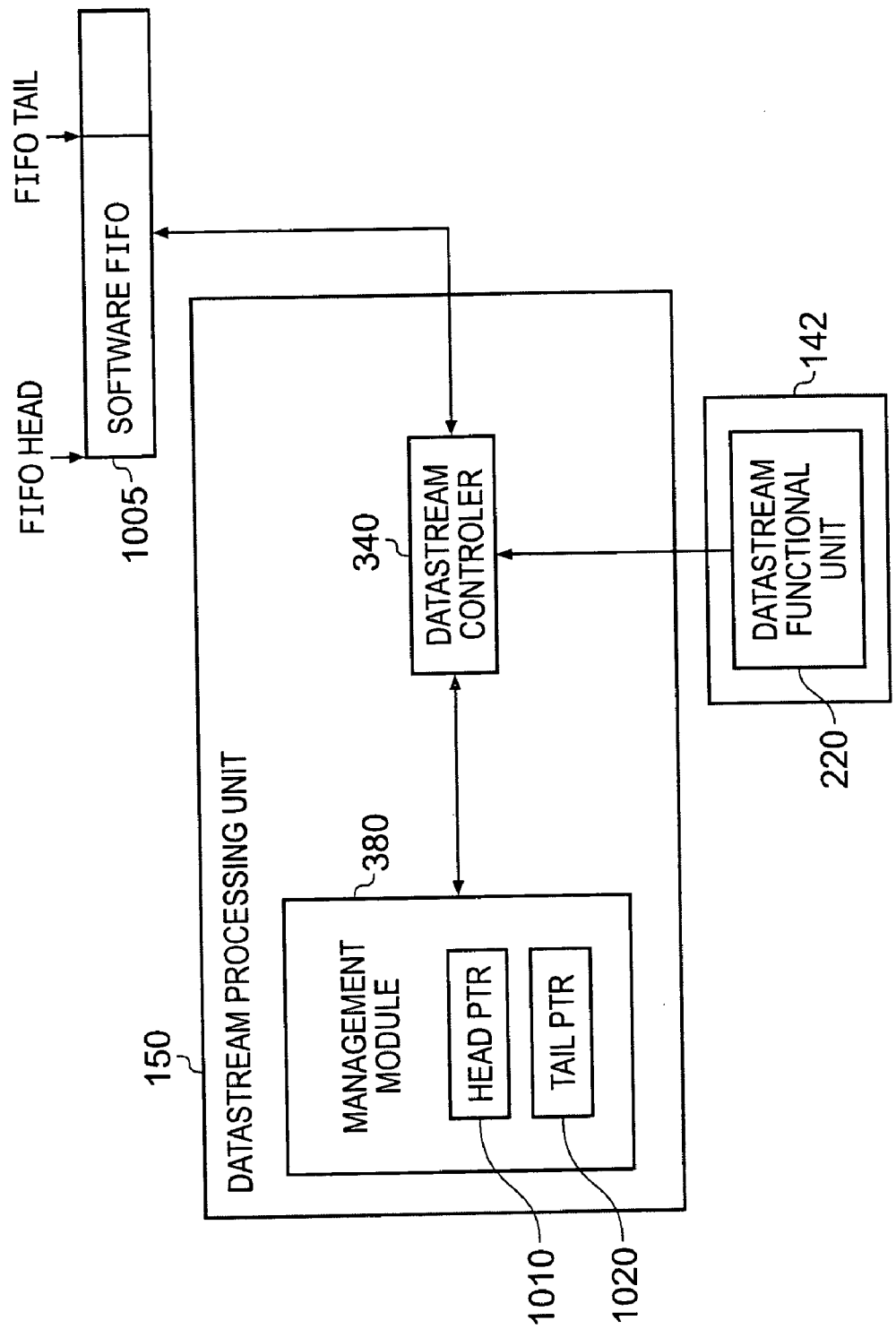
FIG. 10 schematically illustrates an arrangement in which the buffer of FIG. 3 is implemented as a software FIFO.

FIG. 10 schematically illustrates an arrangement in which the buffer of FIG. 3 is implemented as a software FIFO. FIG. 10 shows a subset of the constituent elements of the data stream processing unit 140 and the data engine core 142 and illustrates their interaction with a software FIFO 1005. The software FIFO 1005 is coupled to the data stream controller 340, which is operable to selectively supply data elements of an input data stream to the software FIFO 1005 for buffering. The data stream controller 340 is operable to manage the filling and draining of the software FIFO 1005 in response to at least one of a local head address 1010 and a local tail address 1020 stored in the management record maintained by the management module 380. The memory region associated with the software FIFO is defined by partition pointers.

The local head address 1010 and the local tail address 1020 are physical addresses associated with the memory region allocated for use as the software FIFO 1005. The head pointer 1010 controls the memory location to which new data elements written when they are received by the software FIFO 1005 from the data input registers 510 (see FIG. 5). The tail pointer 1020 is advanced when data elements at or close to the tail position are no longer required e.g. because they have already been transmitted in an output data stream.

The management module 380 keeps track of which data elements stored in the buffer are no longer required and manages advancement of the head pointer 1010 and the tail pointer 1020. However these two pointers 1010 and 1020 can also be changed in response to execution of an instruction by the data stream functional unit 220, which sends a command signal to the data stream controller 340 to change the current pointer value(s) stored by the management module 380. An example of this was described above with reference to STEP 5 of FIG. 9B.

The head pointer is moved in dependence upon DMA data offered to the data stream processing unit over the DMA interface 370 and data accept module 320, and the available space in the buffer (the head does not bite the tail yet). The tail pointer is updated in response to getbit( ) type commands issued from the control interface 350. However, the tail is not modified after a forward( ) instruction (equivalent to bufferbytes( )), The software FIFO 1005 is formed as a circular buffer memory (ring buffer) in which the head pointer and tail pointer define respectively the beginning and end of the data being stored and wrap around the ends of the memory address space in the conventional manner for a circular buffer.

To perform data handling operations in systems that do not have a data stream processing unit 150, many of the data handling operations need to be explicitly specified in software by the programmer. For example, the following piece of program code (written in the C programming language) performs a function equivalent to the getbits( ) instruction according to the present technique i.e. retrieval of a portion of data from a data stream:—

```
Getbits(bits2get)
{
If (bits2get<=bitsstillinword)
    {
/* case 1: This current (register stored) word contains sufficient
bits to honour the request */
/* LSB align the desired bits depending on the number still available:
">>" */
/* Mask the unwanted bits from the word: "&" */
    Out = (word >> (32-bitsstillinword)) & ((1<< bits2get) -1);
/* Update the number of available bits in the word */
    Bitsstillinword = bitsstillinword - bits2get;
    }
Else
    {
/* case 2: This current (register stored) word does not contain
sufficient bits to honour the request */
/* As with case 1, but limited to the number of bits still available
*/
    Part1bits = bitsstillinword;
    Part1 = (word >> (32-bitsstillinword)) & ((1<< bitsstillinword)
-1);
/* get a completely fresh word and update all relevant variables
accordingly */
    Addr++;
    Word = buffer[addr];
    Part2bits = bits2get- bitsstillinword;
    Bitsstillinword = 32;
/* As with case 2, but limited to the number of bits still missing */
    Part 2= (word >> (32-bitsstillinword)) & ((1<< Part2bits) -1);
/* Concatenate: "|" the two parts with the proper allignment: "<<" */
    Out = (part2 << Part1bits) | Part1;
    Bitsstillinword = bitsstillinword - Part2bits;
    }
Return out
}
```

It can be seen from the above program code that data handling operations such as bit alignment, masking and concatenation are specified in the software function. According to the present technique, all of these data handling operations are abstracted away from the programmer. To retrieve a portion of data according to the present technique, the data engine core 142 simply executes the getbits( ) instruction and this results in control signals being sent to the control interface 350 (see FIG. 3), in response to which the data stream processing unit 150 performs retrieval of the portion of data from the data stream.

The above program code is for use in a system in which the format of the retrieved data is dictated by the physical properties of the system i.e. the bus width and port width.

Figure 11A:
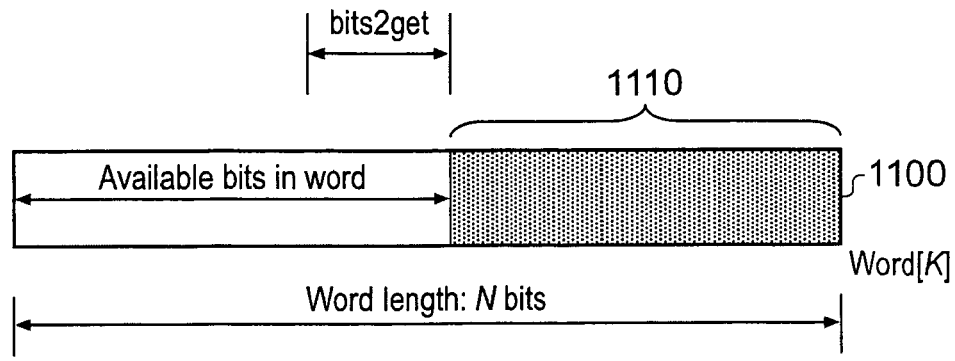
FIGS. 11A and 11B illustrate retrieval of a data portion from data words having predetermined sizes.

FIG. 11A schematically illustrates "case 1" in the above program code, in which a portion of data is to be retrieved from the data word 1100. In FIG. 11A, the bus width (equivalent to the word length) is N bits and the portion of data to be retrieved corresponds to the data portion "bits2get". In this case, the requested number of bits of data is sufficiently small that it is contained within the single data word 1100. A portion 1110 corresponds to data that has already been consumed. Of the available data, only a subset corresponds to the "bits2get". In order to retrieve this data the available bits are least significant bit (LSB) aligned and the unwanted bits in the word are masked.

Figure 11B:
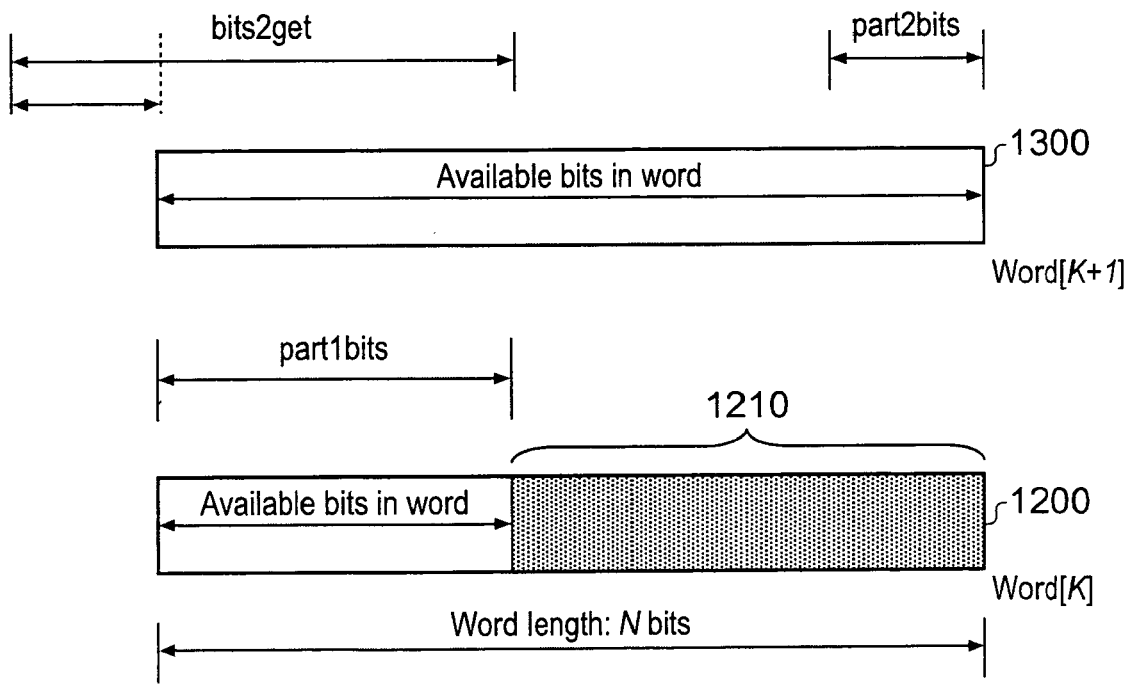

FIG. 11B schematically illustrates "case 2" in the above program code. In this example, the bits to be retrieved "bits2get" span across two data words i.e. a first data word 1200 and a second data word 1300. A data portion 1210 of the first data word 1200 corresponds to the bits already consumed. The available bits "part1bits" of the first data word 1200 are not sufficient in number to fulfill the request for data so the second data word 1300 must also be retrieved and a portion of the second data word "part2 bits" corresponding to the additional number of bits required to fulfill the request is extracted form the second data word 1200. The "part1bits" from the first data word 1200 and the "part2 bits" from the second data word are then concatenated with an LSB alignment ready for output.

Figure 12A:
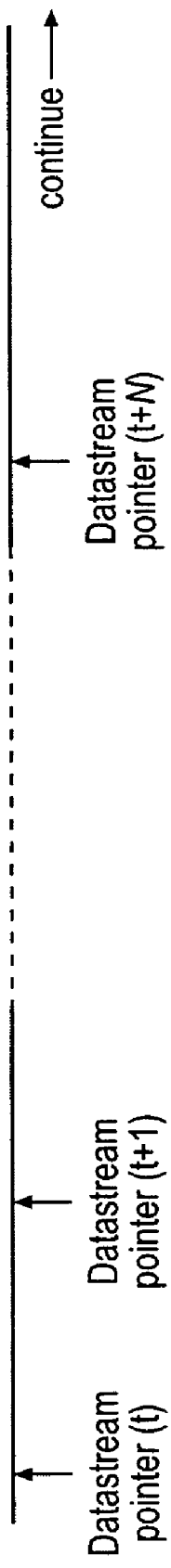
FIGS. 12A and 12B schematically illustrate how a set-count( ) instruction performs a data protection function.
Figure 12B:
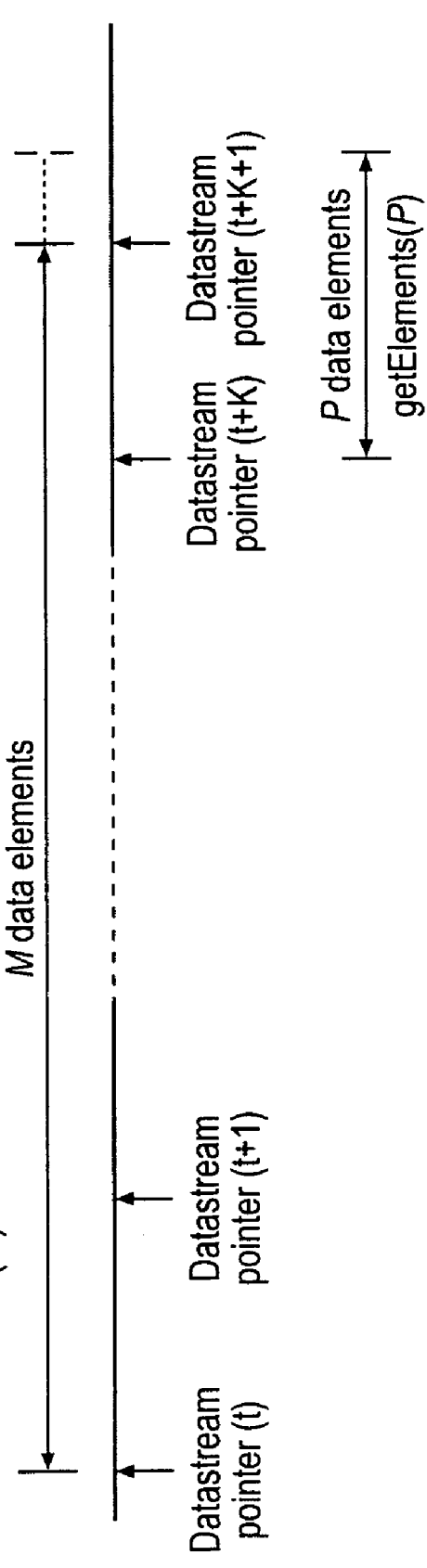

FIGS. 12A and 12B schematically illustrate the use of the setcount( ) instruction. The setcount( ) and resetcount( ) instructions are specifically provided to make data stream access safer.

In FIG. 12A the argument to the setcount( ) instruction is a default value, which means that there are no restrictions on the number of bits that can be read out from the data stream. Thus the datastream pointer can be incremented without limit. Note however that the datastream pointer has an associated state comprising at least the value of the pointer. An additional state variable corresponds to whether the data pointer is locked or unlocked. In the locked state data output is prevented.

In FIG. 12B the setcount( ) instruction has an argument M. This sets an upper limit for the data pointer state relative to a state of the bit pointer at the moment a command (i.e. control signal(s)) associated with the setcount(M) instruction is sent from the data engine core 142 to the data stream processing unit 150 (see FIG. 3). In FIG. 12B, the state of the data stream pointer when the setcount(M) command was sent to the data stream processing unit 150 corresponded to a value of t. At a subsequent time, corresponding to a state when the data stream pointer had a value of (t+K), command signals resulting from execution of a data retrieval instruction getElements (P) were received by the data stream processing unit 150. The getelements(P) instruction requested retrieval of P data elements from the data stream. However, as shown in FIG. 12B, retrieval of P data elements results in exceeding the setcount (M) threshold for the data stream pointer. The threshold value is equal to t+M. Accordingly, the output of the getElements (P) operation is declared invalid.

Whilst in the above discussion of embodiments of the present invention, a main processor (i.e. main processing unit) has been described as connected to a single data engines, it could also be connected to a single layer comprising a plurality of data engines. It is also possible to arrange a number of data engines in a hierarchical manner. For example, the main processor can present itself to a higher level of hierarchy as a data engine.

For the interested reader, more general aspects of an embodiment of the present invention are described in the following paragraphs.

Overview

AudioDE is an application class-specific data engine that is tailored for embedded Digital Signal Processing in portable audio applications. The combination of architectural properties and the highly parallelizing compiler yield a solution that results in minimal power and area requirements for audio applications. Accompanying dedicated system functions and general ARM-AMBA interface functions (AIKO) support an easy integration of AudioDE.

Introduction

The design objective for the AudioDE focuses on the requirements for portable audio players: maximising Performance for Power and Area (PPA). This results in a Digital Signal Processing Platform (DSP), which requires minimal MHz for its tasks, yet with a small core size, and small memory footprint. Despite the name, the AudioDE can be applied equally well to other DSP algorithms, as the microarchitecture features a standard DSP instruction set, both for integer and fractional data computation.

The AudioDE core strikes a balance between computational resources, register files, memory bandwidth and address generation capabilities. This property together with its multiple instruction set Variable Length-Long Instruction Word (VL-LIW) controller enables the development of very fast, extremely parallel algorithms, as they are common in the application area of interest, minimising the MHz requirements.

The AudioDE is a dual Harvard architecture, with a single 24-bit Arithmetic Logic Unit (ALU) and a single 24×24-bit Multiplier and ACcumulator unit (MAC) with 48-bit accumulation. These units operate in parallel with the two data-memory ports and accompanying address generators. Efficient single-cycle memory access is supported for all addressing modes, like bit-reverse and modulo addressing.

The ALU is enhanced with instructions to facilitate the bit-stream access which is typical for compressed media files. This feature enables the AudioDE to process data directly from a DMA driven input stream, and provides automatic buffering facilities for out-of-order access in the stream, as is common to many standards. Similar to the other external interfaces, like memory ports, AudioDE automatically enters a low power mode when data is unavailable.

The OptimoDE architecture comes with a comprehensive suite of development tools. These tools comprise both architectural tools, which enable enhancements of the core, simulation tools, like an instruction set simulator, and OptimoDE's highly parallelizing compiler. The compiler achieves a code efficiency that is as good as any handcrafted assembly library. Since the tools can be operated in an interactive environment, feedback is provided for optimisations at the source level and for trade-offs between speed and object code size.

An MP3 decoder is a good example of the efficiency of the AudioDE core and the OptimoDE tools. The decoder can be programmed to require only 8 MHz cycles, with 22 KByte program- and 22 Kbyte data memory, yielding 0.8 mW power consumption on 0.13μ CMOS at 1.2V on a 42 Kgate core.

OptimoDE Technology

AudioDE is derived from the standard OptimoDE architecture, using the standard tool and IP framework offered as part of the architecture. This means that, although a specific configuration is presented in this paper, it easy to create variants or extensions to fit the application even better.

There are three phases in the development cycle of data engines:

Design phase: The selection or creation of a micro-architecture,

Programming phase: The compilation and profiling of the source code for the tasks that will run on the data engine for a fixed architecture, Implementation phase: Instantiation of the micro-architecture in synthesizable Verilog. This involves the instantiation of standard or user-defined resources.

Figure 13:
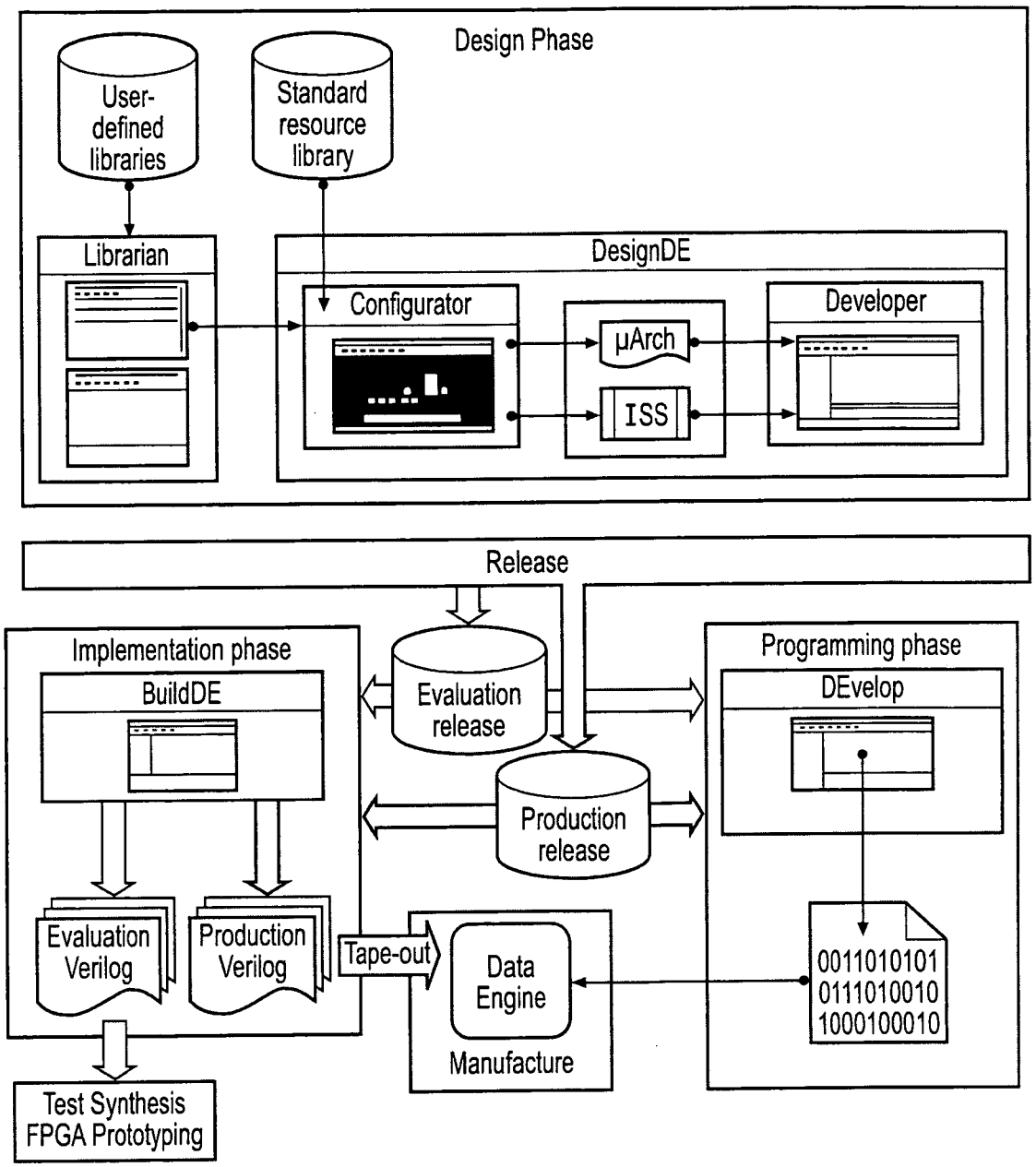
FIGS. 13 to 15 schematically illustrate general aspects of an embodiment of the present invention.

When the microarchitecture can be modified, the first two phases can become an iterative process. The configuration tools all being part of a single framework simplifies this process. Otherwise only the last two phases are applicable, and only the machine code for the fixed architecture will be generated. FIG. 13 illustrates this process.

The result of the design phase is the release of a micro-architecture with fixed properties with the DesignDE configuration tools. An ISS model is generated as well.

Part of this process involves programming and profiling relevant code fragments, identical to the programming phase described below, but for the specific purpose of improving the microarchitecture.

DesignDE has several components. The Configurator tool imports predefined micro-architectures and enables easy modifications and extensions. In the latter case the designer defines the interconnect between the data path resources. A standard resource library with functional units is provided.

The design of user-defined resources is facilitated by Librarian, which maintains the library of such components and generates Verilog from a C, C++ or SystemC source description. This Verilog is functionally correct and synthesisable.

The result of the programming phase is the release of microcode with the DEvelop compiler corresponding to the given source code for the provided microarchitecture.

The compilation of the source code is performed in an interactive way. DEvelop provides detailed static profiling results on the detailed schedule and resource usage.

Improved dynamic profiling can be performed based on the ISS model which complements the microarchitecture.

The result of the implementation phase is synthesisable Verilog of the microarchitecture instantiated with the BuildDE tool. Because code development requires only the result of the design phase, the implementation phase can be performed in parallel to it, thus reducing lapse time.

Application Class-Specific Design Flow

AudioDE is a specific result of a core configured using the OptimoDE tools. This section describes the design process of the AudioDE, starting from one of the OptimoDE starting microarchitectures.

Figure 14:
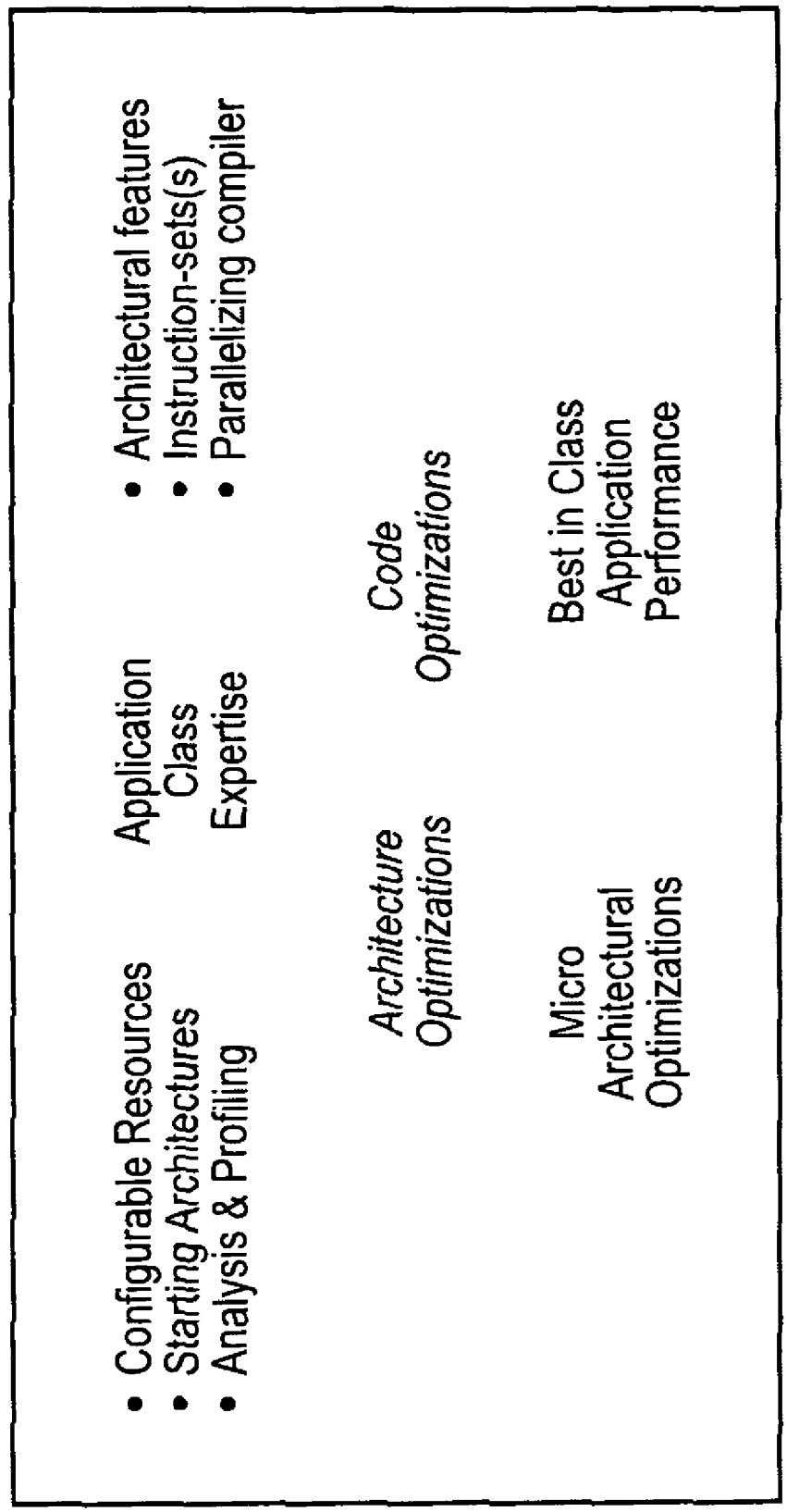

FIG. 14 illustrates the various steps in the design process. The purpose of the process is to find a balance between the core cost and its efficiency, while eliminating the risk of over-design.

Algorithm and application class analysis: As a starting point many existing audio applications and generic DSP applications were analysed and profiled. Among others, the following observations were deemed relevant for audio algorithms:

Noise requirements favour a 24-bit data path which reduces intermediate scaling overhead, Audio coding algorithms are based on a MAC-intensive filter bank, Variable length data is read from and deposited on a bit-stream.

Those and more elaborate observations are used to define performance expectations for the microarchitecture, to be resolved by either instruction set specialisation or by datapath parallelism.

Application-specific resources and instruction sets: One of the applications of this method for AudioDE resulted in enhancements to a standard ALU for bit-stream access. The algorithm analysis indicates that providing instructions specifically for this purpose results in significant savings.

This specialisation is particularly effective, because it does not only save MHz of compute cycles but also because it reduces structural complexity by providing a unified interface to a streaming medium.

In general, the AudioDE features a rich instruction set, with equal attention for fractional arithmetic for signal processing, integer arithmetic for standard C support, and enhanced instructions for zero-overhead address computation.

System architecture tuning: This aspect of the microarchitecture definition addresses the capability to perform sustained zero-overhead parallel MAC-style computation. Performance indicators are both the traditional DSP benchmark algorithms and the filter code found in audio applications.

This tuning stage defined a data path that supports high throughput computation while remaining efficient in terms of area and power consumption. Consequently, the AudioDE system architecture was chosen to contain only a single MAC and ALU. Though this limits operator parallelism, the ALU and MAC are arranged in such a way that the algorithm can be operated with a 100% load on the units, thus providing a high level of data movement parallelism.

AudioDE Hardware Architecture

Figure 15:
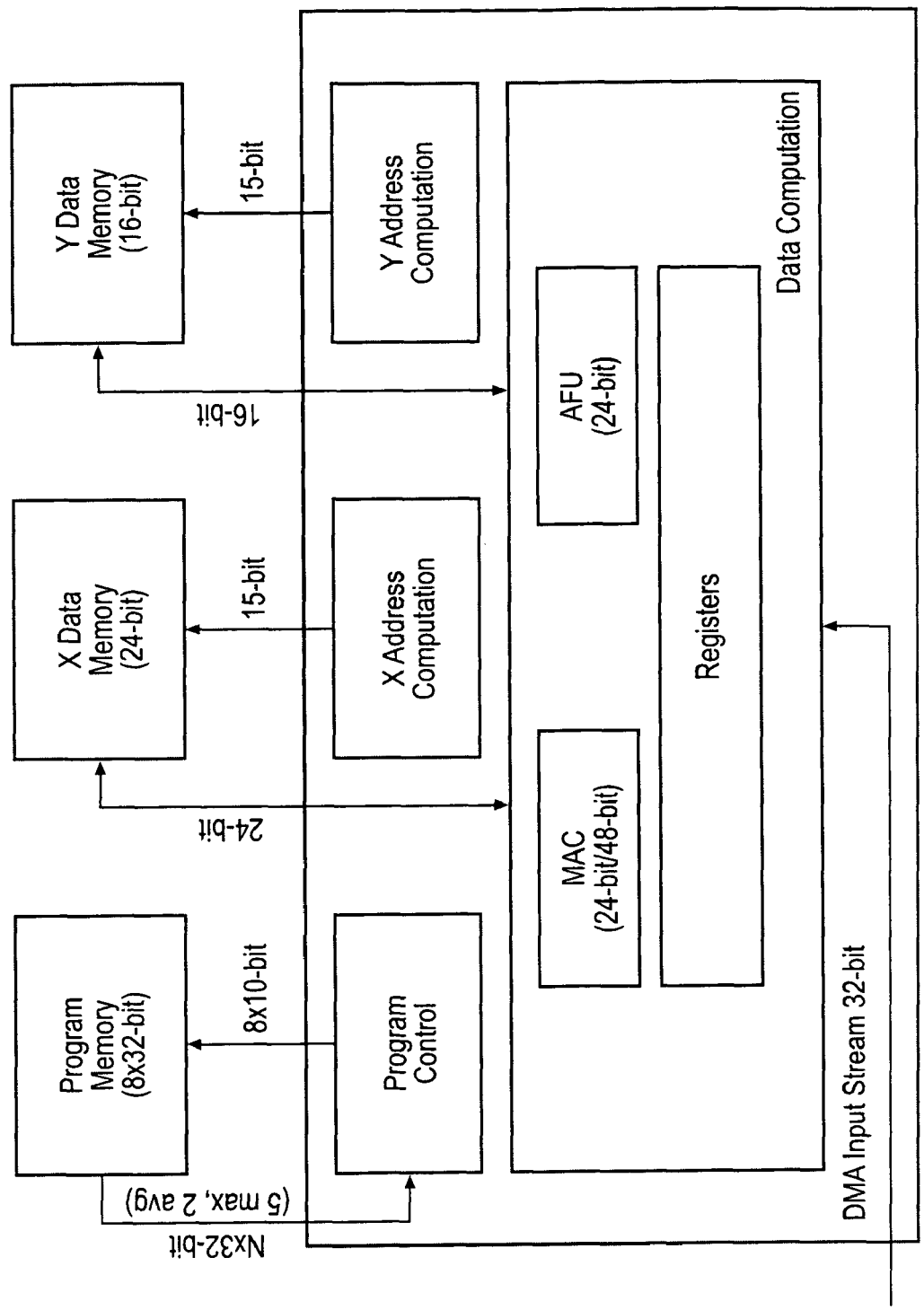

The overall hardware architecture is illustrated in FIG. 15.

The AudioDE features a low branch delay controller with multiple instruction sets and Variable Length Long Instruction Words (VL-LIW). The fact that the OptimoDE compiler has full visibility of the instruction and data pipeline all program- and loop control complexity is taken care of by the development tools reducing the hardware complexity.

All AudioDE functional units are single-cycle without internal pipeline. Because the OptimoDE compiler accounts for all data path behaviour, units can be pipelined to achieve higher clock frequencies without any modifications in the controller.

The AudioDE data path consists of a 24-bit ALU and a 24-bit MAC unit. The MAC unit either performs a single-precision multiplication, or a single-cycle, double-precision accumulation. Fractional multiplication is supported by automatic alignment of the output. All instructions can be saturating or non-saturating, because the saturation unit is an integral part of the unit. In addition, both the ALU and the MAC support implicit and explicit rounding instructions for multiplications, right-shifts and type conversions.

The data path features a large high-bandwidth register file. Its size is suitable for high speed radix-4 computations of FFT and DCT or similar algorithms.

To reduce structural complexity in the AudioDE core, and to simplify the task of the compiler, the arithmetic data path is relatively isolated from the address generation data path described below.

To sustain simple single-cycle multiply-accumulate sequences as well as high radix algorithms, two independent data memory ports have been provided, next to a third single-wide program memory port.

To minimise the memory requirements for cost-sensitive embedded applications, the X and Y-memories are made asymmetric. Only the X-memory is 24 bits wide to satisfy typical audio processing requirements, while the Y-memory is optimised to 16 bits, sufficient for integer and coefficient data. The large data path register file ensures that there is no penalty associated with the fact that 24-bit data is limited to the X-memory only.

The memories of the AudioDE are outside of the data path, to give total freedom with respect to cost optimisation and system integration issues, as discussed in section 0.

Each data memory has its own address generator with a 15-bit address range. Note that this is address range holds for a single task; the total address range can be extended by memory management functionality in the sub-system.

The address generators are capable of single-cycle operation in all modes, which include automatic modulo addressing and programmable bit-reverse addressing. The latter is particularly important for FFT algorithms.

The number of available primary pointer and secondary pointer manipulation register fields are optimised, to save on power, area and control complexity.

The stream interface is a unique multimedia specific feature of the AudioDE, for improved performance and reduced complexity, both from a programming and an integration point of view.

This interface enables the AudioDE to be connected as a DMA slave device and to process the bit-stream without the need for any further interaction with the host system.

Its data path API provides functions for variable-length bit-stream access with automatic data alignment, and stream buffer and rewind functions for the out-of-order access to bit-streams which are common in Constant Bit-Rate (CBR) audio coding algorithms.

Power Reducing Features

The general OptimoDE approach with regard to low-power consumption is to reduce the MHz requirement by exploiting all available parallelism. This results in very dense code with a very high resource activity, thus minimising unwanted on-off toggling of resources as well. In addition, for loop bodies, such dense code is suitable for caching or other optimisations regarding memory management within the scope of the system outside the core.

Apart from those structural advantages, the AudioDE core is equipped with additional power-saving technology. On top of that specific low-power libraries like those provided by ARM's Physical IP Division can be used during silicon-mapping.

Clock-gating: The AudioDE core description is fully compatible with industry standard clock-gating insertion.

The AudioDE is designed specifically for both a streaming interface and for external memory usage. In case data is unavailable, the AudioDE core automatically enters a low-power stall mode.

The OptimoDE compiler has full visibility of the complete instruction and data pipeline. So when data must be available for input, or when it is produced, this property avoids unexpected pipeline stalls and the additional logic involved.

System Integration

Although AudioDE relates to the data engine, it is specifically designed for cost-efficient system integration as well. For this reason, several components have been explicitly excluded from the core to offer the possibility to share these functions with blocks already present in the system, like for example a DMA controller.

The same freedom for optimisation is offered to the system designer with respect to cost-sensitive system memory aspects. Two example system integration scenarios are outlined below. Both scenarios are supported by standard OptimoDE components, like the AMBA Integration Kit for OptimoDE (AIKO).

Cost-minimised solution: This scenario addresses a power- and area-optimised solution that comes at the expense of application flexibility. This would for example fit low-cost portable Flashcard-based audio player products.

In this case the AudioDE is integrated with local dedicated memories. This configuration minimises power consumption because the memory sizes and topology can be freely chosen as a function of the best result. Additionally, the streaming interface completely removes the need for any fast system interaction, thus enabling the AudioDE to operate as a highly efficient smart peripheral device.

The AIKO interfaces assure that the memories are always visible to the system.

Flexible shared memory architecture: This scenario targets a maximal flexibility with respect to application development, under the constraint of minimal memory power consumption. An example of such an application would be an audio player supporting many different codecs.

In this case all AudioDE memory ports are connected to a flexible single-level shared memory arbiter, as are any system resources, like a host bus or the DMA controller. This setup guarantees a lock-free and starvation-free operation of all system functions, while it still enables optimal memory sizes and lay-out for minimal power consumption.

This particular AudioDE sub-system also features a lightweight memory management function to enable a dynamic configuration of memory and task address spaces.

MP3 Application Example

An ISO/IEC-compliant MP3 decoder algorithm was compiled for the AudioDE in order to establish a performance proof point. This algorithm has two distinct aspects. First, the bit-stream decode and dequantise functionality, followed by stereo processing and a large two-stage synthesis filter bank.

The first part of the code employed the rich AudioDE bit-stream access API. This resulted in simple, compact and very efficient code. The second part of the algorithm was organised to take advantage of the high radix processing capability of the AudioDE. For both sections C-code was used as the source language.

The resulting algorithm required 8 MHz cycles for a stereo signal sampled at 48 KHz, from a 320 Kbit/s bit-stream. This code used 22 KByte program memory and 22 Kbyte data memory. Deploying the power saving techniques mentioned in section 0, yielded a 42 Kgate core with a power consumption of 0.1 mW/MHz on 0.13μ CMOS at 1.2V using ARM's Physical IP low-power libraries. When decoding such an audio stream, power consumption for the AudioDE core is just under 0.8 mW, while with an optimal memory subsystem total power consumption would be well below 2 mW.

Conclusion

AudioDE is a small and power-efficient core, derived from the OptimoDE architecture and using the standard supplied configuration and development tools. The result of this is a design capable of executing an MP3 benchmark algorithm with half the gates and resources, yet at nearly twice the speed of alternative solutions.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing system comprising:
   (i) a main processor configured to perform a plurality of data processing tasks;
   (ii) a data engine having a data engine core configured to perform a number of said plurality of data processing tasks on behalf of said main processor;
   (iii) a data stream processing unit providing a data communication path between said main processing unit and said data engine core, said data stream processing unit having:
      (a) a control interface configured to receive from said data engine core at least one command; and
      (b) a data stream controller configured to receive at least one input data stream and to perform at least one operation on said at least one input data stream to generate at least one output data stream comprising a sequence of data elements;
   wherein said data stream processing unit is responsive to said at least one command from said data engine core to control said data stream controller to perform said at least one operation, and said data stream processing unit is configured to maintain management information comprising at least one reference position in said at least one input data stream, said data stream processing unit implementing the at least one command in dependence upon said at least one reference position, wherein said data stream controller is configurable by at least one of said data engine and said main processor with configuration information.

2. A data processing system according to claim 1, wherein said number of data processing tasks performed by said data engine core comprises a sequence of instructions including at least one instruction of an instruction set executable by said data engine core, said data engine core, upon execution of said at least one instruction, configured to issue said at least one command to said control interface of said data stream processing unit.

3. A data processing system according to claim 2, wherein said input data stream is a multimedia data stream structured according to a predetermined set of rules and wherein said instruction set is defined in dependence upon said predetermined set of rules.

4. A data processing system according to claim 2, wherein said at least one instruction of said instruction set executable by said data engine core is either an instruction having a conditional return or an instruction having an unconditional return.

5. A data processing system according to claim 2, wherein said at least one instruction corresponds to a respective process to be performed by said data stream controller in response to said at least one command issued by said data stream functional unit and wherein said respective process has an associated state machine maintained by said data stream controller.

6. A data processing system according to claim 1, wherein said data stream processing unit is configured to act on said at least one command asynchronously with respect to reception of said input data stream by said data stream controller or with respect to transmission of elements of said output data stream.

7. A data processing system according to according to claim 1, wherein said data stream controller is configured, when performing said at least one operation, to selectively buffer in an associated buffering resource at least a portion of said at least one input data stream.

8. A data processing system according to claim 7, wherein said data stream processing unit comprises data output logic comprising a multiplexer configured to selectively output data from said buffering resource and wherein said data stream controller is configured to control an output of said multiplexer to generate said at least one output data stream.

9. A data processing system according to claim 7, wherein said associated buffering resource is a software FIFO.

10. A data processing system according to claim 7, wherein said data stream controller is configured to maintain a record of which portions of said at least one input data stream are currently stored in said associated buffering resource.

11. A data processing system according to claim 7, wherein said configuration information comprises a size of said buffering resource associated with said data stream controller.

12. A data processing system according to claim 7, wherein said configuration information supplied to said data stream processing unit by at least one of said data engine and said main processor comprises a start point and an end point of said buffering resource associated with said data stream controller.

13. A data processing system according to claim 7, wherein said instruction set executable by said data engine core comprises a buffering instruction configured to cause said data stream controller to selectively buffer data portions of said at least one input data stream.

14. A data processing system according to claim 7, wherein said management information comprises at least one of:
   a record of which data elements of said at least one input data stream have been stored in said buffering resource; and
   a record of which data elements of said at least one input data stream have been received by said data stream controller.

15. A data processing system according to claim 1, wherein said data stream processing unit comprises a processing interface providing a data path to a processing module and wherein said processing module is configured to perform a processing task in response to execution of at least one instruction of said instruction set executable by said data processor core.

16. A data processing system according to claim 15, wherein said configuration information supplied to said data stream processing unit by at least one of said data engine and said main processor comprises at least one characteristic of said processing resource.

17. A data processing system according to claim 1, wherein said at least one input data stream comprises a plurality of data portions ordered in an input temporal sequence and said at least one output data stream comprises said plurality of data portions of said input temporal sequence ordered in an output temporal sequence different from said input temporal sequence.

18. A data processing system according to claim 1, wherein said instruction set executable by said data engine core comprises a data retrieval instruction configured to cause said data stream controller to retrieve at least one data element of said at least one input data stream from said buffering resource and to output said at least one data element to said at least one output data stream.

19. A data processing system according to claim 1, wherein said management information comprises at least a current output position representing data in one of said at least one input data stream to be supplied next by said data stream controller to said at least one output data stream.

20. A data processing system according to claim 1, wherein said instruction set executable by said data engine core comprises a backstep instruction configured to cause said current output position to be changed such that it corresponds to a data element at an earlier point in an input temporal sequence associated with the corresponding input data stream.

21. A data processing system according to claim 1, wherein said instruction set executable by said data engine core comprises a data insertion instruction configured to cause said data stream controller to insert data from said data engine into said at least one output data stream.

22. A data processing system according to claim 1, comprising a direct memory access interface configured to provide a data communication path to a direct memory access controller for supply of said at least one input data stream to said data stream controller.

23. A data processing system according to claim 22, wherein said configuration information comprises at least one property of said direct memory access controller.

24. A data processing system according to claims 1 wherein said data stream processing unit comprises a data input register for temporarily storing data elements of said at least one input data stream before said data stream controller supplies said stored data elements to said at least one output data stream.

25. A data processing system according to claim 1, wherein said instruction set executable by said data engine core comprises a count setting instruction configured to command said data stream processing unit to set an upper limit for a data pointer state relative to a state of said data pointer at a moment a command associated with said count setting instruction is sent from the data engine core to said data stream processing unit.

26. A data processing system according to claim 1, wherein said data stream processing unit is incorporated at least in part in said data engine.

27. A data stream processing unit for providing a data communication path between a main processing unit configured to perform a plurality of data processing tasks and a data engine having a data engine core configured to perform a number of said plurality of data processing tasks on behalf of said main processor, said data stream processing unit having:
   (a) a control interface configured to receive from said data engine core at least one command; and
   (b) a data stream controller configured to receive at least one input data stream and to perform at least one operation on said at least one input data stream to generate at least one output data stream comprising a sequence of data elements;
   wherein said data stream processing unit is responsive to said at least one command from said data engine core to control said data stream controller to perform said at least one operation; and
   said data stream processing unit is configured to maintain management information comprising at least one reference position in said at least one input data stream, said data stream processing unit implementing the at least one command in dependence upon said at least one reference position, wherein said data stream controller is configurable by at least one of said data engine and said main processor with configuration information.

28. A data processing method comprising:
   (i) allocating a plurality of data processing tasks to a main processor;
   (ii) performing a number of said plurality of data processing tasks on behalf of said main processor using a data engine having a data engine core;
   (iii) providing a data communication path between said main processing unit and said data engine core using a data stream processing unit;
   (iv) receiving at said data stream processing unit at least one command from said data engine core;
   (v) receiving at a data stream controller of said data stream processing unit at least one input data stream;
   (vi) performing at least one operation on said at least one input data stream to generate at least one output data stream comprising a sequence of data elements;
   wherein said data stream processing unit is responsive to said at least one command from said data engine core to control said data stream controller to perform said at least one operation; and
   said data stream processing unit is configured to maintain management information comprising at least one reference position in said at least one input data stream, said data stream processing unit implementing the at least one command in dependence upon said at least one reference position, wherein said data stream controller is configurable by at least one of said data engine and said main processor with configuration information.

29. A data processing system comprising:
   (i) a main processor configured to perform a plurality of data processing tasks;

(ii) a data engine having a data engine core configured to perform a number of said plurality of data processing tasks on behalf of said main processor;

(iii) a data stream processing unit providing a data communication path between said main processing unit and said data engine core, said data stream processing unit having:

(a) a control interface configured to receive from said data engine core at least one command; and (b) a data stream controller having a first interface to at least one data stream and a second interface to at least one data element stream comprising a sequence of data elements, the data stream controller configured to perform at least one operation to manage data transfer between said first and said second interfaces;

wherein said data stream processing unit is responsive to said at least one command from said data engine core to control said data stream controller to perform said at least one operation; and said data stream processing unit is configured to maintain management information comprising at least one reference position in said at least one data stream or said at least one data element stream, said data stream processing unit implementing the at least one command in dependence upon said at least one reference position, wherein said data stream controller is configured by said main processor with configuration information.

30. A data processing system according to claim 29, wherein said number of data processing tasks performed by said data engine core comprises a sequence of instructions including at least one instruction of an instruction set executable by said data engine core, said data engine core, upon execution of said at least one instruction, configured to issue said at least one command to said control interface of said data stream processing unit.

31. A data stream processing system according to claim 30, wherein said at least one data stream is a multimedia data stream structured according to a predetermined set of rules and wherein said instruction set is defined in dependence upon said predetermined set of rules.

32. A data processing system according to claim 30, wherein said at least one instruction of said instruction set executable by said data engine core is either an instruction having a conditional return or an instruction having an unconditional return.

33. A data processing system according to claim 30, wherein said at least one instruction corresponds to a respective process to be performed by said data stream controller in response to said at least one command issued by said data stream functional unit and wherein said respective process has an associated state machine maintained by said data stream controller.

34. A data stream processing system according to claim 29, wherein said data stream processing unit is configured to act on said at least one command asynchronously with respect to receipt or transmission of said at least one data stream of said first interface or said at least one data element stream of said second interface.

35. A data stream processing system according to claim 29, wherein said data stream controller is configured, when performing said at least one operation, to selectively buffer in an associated buffering resource at least a portion of said at least one data stream or said at least one data element stream.

36. A data processing system according to claim 35, wherein said data stream processing unit comprises data output logic comprising a multiplexer configured to selectively output data elements from said buffering resource and wherein said data stream controller is configured to control an output of said multiplexer to generate said at least one data element stream.

37. A data processing system according to claim 35, wherein said associated buffering resource is a software FIFO.

38. A data processing system according to claim 35, wherein said data stream controller is configured to maintain a record of which portions of said at least one data stream or said at least one data element stream are currently stored in said associated buffering resource.

39. A data processing system according to claim 35, wherein said configuration information comprises a size of said buffering resource associated with said data stream controller.

40. A data processing system according to claim 35, wherein said configuration information supplied to said data stream processing unit by said main processor comprises a start point and an end point of said buffering resource associated with said data stream controller.

41. A data processing system according to claim 35, wherein said instruction set executable by said data engine core comprises a buffering instruction configured to cause said data stream controller to selectively buffer data of said at least one data stream or said at least one data element stream.

42. A data processing system according to claim 35, wherein said management information comprises at least one of:

a record of which data of said at least one data stream or said at least one data element stream has been stored in said buffering resource; and a record of which data of said at least one data stream or said at least one data element stream has been received by said data stream controller.

43. A data processing system according to claim 29, wherein said data stream processing unit comprises a processing interface providing a data path to a processing module and wherein said processing module is configured to perform a processing task in response to execution of at least one instruction of said instruction set executable by said data processor core.

44. A data processing system according to claim 43, wherein said configuration information supplied to said data stream processing unit by said main processor comprises at least one characteristic of said processing resource.

45. A data processing system according to claim 29, wherein said at least one data stream comprises a plurality of data elements ordered in a first temporal sequence and said at least one data element stream comprises said plurality of data elements of said first temporal sequence ordered in a second temporal sequence different from said first temporal sequence.

46. A data processing system according to claim 29, wherein said instruction set executable by said data engine core comprises a data retrieval instruction configured to cause said data stream controller to retrieve at least one data item from said buffering resource and to output said at least one data item to said first interface or to said second interface.

47. A data processing system according to claim 29, wherein said management information comprises at least a current output position representing a data item in one of said at least data stream or said at least one data element stream to be supplied next for output by said data stream controller to said first interface or to said second interface.

48. A data processing system according to claim 29, wherein said instruction set executable by said data engine core comprises a backstep instruction configured to cause said current output position to be changed such that it corresponds to a data item at an earlier point in a temporal sequence associated with the corresponding one of at least one data stream or at least one data element stream.

49. A data processing system according to claim 29, wherein said instruction set executable by said data engine core comprises a data insertion instruction configured to cause said data stream controller to insert data from said data engine into said at least one data stream or said at least one data element stream.

50. A data processing system according to claims 29, comprising a direct memory access interface configured to provide a data communication path to a direct memory access controller for supply of said at least one data stream to said data stream controller.

51. A data processing system according to claim 50, wherein said configuration information comprises at least one property of said direct memory access controller.

52. A data processing system according to claim 29, wherein said data stream processing unit comprises a data input register for temporarily storing data of said at least one data stream or said at least one data element stream before said data stream controller outputs said stored data to said first interface or said second interface.

53. A data processing system according to claim 29, wherein said instruction set executable by said data engine core comprises a count setting instruction configured to command said data stream processing unit to set an upper limit for a data pointer state relative to a state of said data pointer at a moment a command associated with said count setting instruction is sent from the data engine core to said data stream processing unit.

54. A data processing system according to claim 29, wherein said data stream processing unit is incorporated at least in part in said data engine.

55. A data stream processing unit for providing a data communication path between a main processing unit and a data engine core, said data stream processing unit comprising:
   a control interface configured to receive from said data engine core at least one command; and
   a data stream controller having a first interface to at least one data stream and a second interface to at least one data element stream comprising a sequence of data elements, the data stream controller configured to perform at least one operation to manage data transfer between said first and said second interfaces;
   wherein said data stream processing unit is responsive to said at least one command from said data engine core to control said data stream controller to perform said at least one operation; and
   said data stream processing unit is configured to maintain management information comprising at least one reference position in said at least one data stream or said at least one data element stream, said data stream processing unit implementing the at least one command in dependence upon said at least one reference position, wherein said data stream controller is configured by said main processor with configuration information.

56. A data processing method comprising:
   allocating a plurality of data processing tasks to a main processor;
   performing a number of said plurality of data processing tasks on behalf of said main processor using a data engine having a data engine core;
   providing a data communication path between said main processing unit and said data engine core using a data stream processing unit;
   receiving at said data stream processing unit at least one command from said data engine core; and
   performing at least one operation to manage data transfer between a first interface to at least one data stream and a second interface to at least one data element stream of a datastream controller;
   wherein said data stream processing unit is responsive to said at least one command from said data engine core to control said data stream controller to perform said at least one operation; and
   said data stream processing unit is configured to maintain management information comprising at least one reference position in said at least one data stream or said at least one data element stream, said data stream processing unit implementing the at least one command in dependence upon said at least one reference position, wherein said data stream controller is configured by said main processor with configuration information.

57. A data processing system comprising:
   (i) a main processor configured to perform a plurality of data processing tasks;
   (ii) a data engine having a data engine core configured to perform a number of said plurality of data processing tasks on behalf of said main processor;
   (iii) a data stream processing unit providing a data communication path between said main processing unit and said data engine core, said data stream processing unit having:
      (a) a control interface configured to receive from said data engine core at least one command; and
      (b) a data stream controller configured to receive at least one input data stream and to perform at least one operation on said at least one input data stream to generate at least one output data stream comprising a sequence of data elements;
   wherein said data stream processing unit is responsive to said at least one command from said data engine core to control said data stream controller to perform said at least one operation, and
   said data stream processing unit is configured to maintain management information comprising at least one reference position in said at least one input data stream, said data stream processing unit implementing the at least one command in dependence upon said at least one reference position, wherein said management information comprises at least a current output position representing data in one of said at least one input data stream to be supplied next by said data stream controller to said at least one output data stream.

58. A data processing system comprising:
   (i) a main processor configured to perform a plurality of data processing tasks;
   (ii) a data engine having a data engine core configured to perform a number of said plurality of data processing tasks on behalf of said main processor;
   (iii) a data stream processing unit providing a data communication path between said main processing unit and said data engine core, said data stream processing unit having:
      (a) a control interface configured to receive from said data engine core at least one command; and
      (b) a data stream controller configured to receive at least one input data stream and to perform at least one operation on said at least one input data stream to generate at least one output data stream comprising a sequence of data elements;
wherein said data stream processing unit is responsive to said at least one command from said data engine core to control said data stream controller to perform said at least one operation, and
said data stream processing unit is configured to maintain management information comprising at least one reference position in said at least one input data stream, said data stream processing unit implementing the at least one command in dependence upon said at least one reference position, wherein said data stream controller is configured, when performing said at least one operation, to selectively buffer in an associated buffering resource at least a portion of said at least one input data stream, wherein said management information comprises at least one of:
a record of which data elements of said at least one input data stream have been stored in said buffering resource; and
a record of which data elements of said at least one input data stream have been received by said data stream controller.

59. A data processing system comprising:
(i) a main processor configured to perform a plurality of data processing tasks;
(ii) a data engine having a data engine core configured to perform a number of said plurality of data processing tasks on behalf of said main processor;
(iii) a data stream processing unit providing a data communication path between said main processing unit and said data engine core, said data stream processing unit having:
   (a) a control interface configured to receive from said data engine core at least one command; and
   (b) a data stream controller configured to receive at least one input data stream and to perform at least one operation on said at least one input data stream to generate at least one output data stream comprising a sequence of data elements;
wherein said data stream processing unit is responsive to said at least one command from said data engine core to control said data stream controller to perform said at least one operation, and
said data stream processing unit is configured to maintain management information comprising at least one reference position in said at least one input data stream, said data stream processing unit implementing the at least one command in dependence upon said at least one reference position, wherein said data stream processing unit comprises a data input register for temporarily storing data elements of said at least one input data stream before said data stream controller supplies said stored data elements to said at least one output data stream.

60. A data processing system comprising:
(i) a main processor configured to perform a plurality of data processing tasks;
(ii) a data engine having a data engine core configured to perform a number of said plurality of data processing tasks on behalf of said main processor;
(iii) a data stream processing unit providing a data communication path between said main processing unit and said data engine core, said data stream processing unit having:
   (a) a control interface configured to receive from said data engine core at least one command; and
   (b) a data stream controller having a first interface to at least one data stream and a second interface to at least one data element stream comprising a sequence of data elements, the data stream controller configured to perform at least one operation to manage data transfer between said first and said second interfaces;
wherein said data stream processing unit is responsive to said at least one command from said data engine core to control said data stream controller to perform said at least one operation; and
said data stream processing unit is configured to maintain management information comprising at least one reference position in said at least one data stream or said at least one data element stream, said data stream processing unit implementing the at least one command in dependence upon said at least one reference position, wherein said management information comprises at least a current output position representing a data item in one of said at least data stream or said at least one data element stream to be supplied next for output by said data stream controller to said first interface or to said second interface.

61. A data processing system comprising:
(i) a main processor configured to perform a plurality of data processing tasks;
(ii) a data engine having a data engine core configured to perform a number of said plurality of data processing tasks on behalf of said main processor;
(iii) a data stream processing unit providing a data communication path between said main processing unit and said data engine core, said data stream processing unit having:
   (a) a control interface configured to receive from said data engine core at least one command; and
   (b) a data stream controller having a first interface to at least one data stream and a second interface to at least one data element stream comprising a sequence of data elements, the data stream controller configured to perform at least one operation to manage data transfer between said first and said second interfaces;
wherein said data stream processing unit is responsive to said at least one command from said data engine core to control said data stream controller to perform said at least one operation; and
said data stream processing unit is configured to maintain management information comprising at least one reference position in said at least one data stream or said at least one data element stream, said data stream processing unit implementing the at least one command in dependence upon said at least one reference position, wherein said data stream controller is configured, when performing said at least one operation, to selectively buffer in an associated buffering resource at least a portion of said at least one data stream or said at least one data element stream, wherein said management information comprises at least one of:
a record of which data of said at least one data stream or said at least one data element stream has been stored in said buffering resource; and
a record of which data of said at least one data stream or said at least one data element stream has been received by said data stream controller.

62. A data processing system comprising:
(i) a main processor configured to perform a plurality of data processing tasks;

(ii) a data engine having a data engine core configured to perform a number of said plurality of data processing tasks on behalf of said main processor;

(iii) a data stream processing unit providing a data communication path between said main processing unit and said data engine core, said data stream processing unit having:

(a) a control interface configured to receive from said data engine core at least one command; and (b) a data stream controller having a first interface to at least one data stream and a second interface to at least one data element stream comprising a sequence of data elements, the data stream controller configured to perform at least one operation to manage data transfer between said first and said second interfaces;

wherein said data stream processing unit is responsive to said at least one command from said data engine core to control said data stream controller to perform said at least one operation; and said data stream processing unit is configured to maintain management information comprising at least one reference position in said at least one data stream or said at least one data element stream, said data stream processing unit implementing the at least one command in dependence upon said at least one reference position, wherein said data stream processing unit comprises a data input register for temporarily storing data of said at least one data stream or said at least one data element stream before said data stream controller outputs said stored data to said first interface or said second interface.

* * * * *